United States Patent
Thomas et al.

(10) Patent No.: US 12,455,942 B2
(45) Date of Patent: Oct. 28, 2025

(54) EXPERIMENT MANAGEMENT SERVICE

(71) Applicant: Amazon Technologies, Inc., Seattle, WA (US)

(72) Inventors: Owen Thomas, Seattle, WA (US); Kenneth O Henderson, Jr., Everett, WA (US); Sumit Thakur, Seattle, WA (US); Glenn Danthi, Seattle, WA (US); Hugh Payton Staub, Seattle, WA (US); Thomas Albert Faulhaber, Seattle, WA (US); Vladimir Zhukov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/171,244

(22) Filed: Feb. 17, 2023

(65) Prior Publication Data
US 2023/0281276 A1  Sep. 7, 2023

Related U.S. Application Data

(63) Continuation of application No. 16/894,707, filed on Jun. 5, 2020, now Pat. No. 11,586,847.
(Continued)

(51) Int. Cl.
| | |
|---|---|
| G06F 9/44 | (2018.01) |
| G06F 8/71 | (2018.01) |
| G06F 9/451 | (2018.01) |
| G06F 9/48 | (2006.01) |
| G06F 9/54 | (2006.01) |
| G06F 16/14 | (2019.01) |
| G06F 16/16 | (2019.01) |

(Continued)

(52) U.S. Cl.
CPC ............ *G06F 18/2148* (2023.01); *G06F 8/71* (2013.01); *G06F 9/451* (2018.02); *G06F 9/485* (2013.01); *G06F 9/54* (2013.01); *G06F 16/144* (2019.01); *G06F 16/164* (2019.01); *G06F 18/2113* (2023.01); *G06F 18/2155* (2023.01); *G06N 20/00* (2019.01); *G06N 20/20* (2019.01)

(58) Field of Classification Search
CPC .. G06F 18/2148; G06F 16/144; G06F 16/164; G06F 18/2113; G06F 18/2155; G06N 20/00
See application file for complete search history.

(56) References Cited

U.S. PATENT DOCUMENTS

| | | |
|---|---|---|
| 9,996,804 B2 | 6/2018 | Bowers et al. |
| 10,395,181 B2 | 8/2019 | Bowers et al. |

(Continued)

OTHER PUBLICATIONS

Unkown, "Experiment Overview", Retrieved from https://www.comet.ml/docs/python-sdk/experiment-overview/ on Apr. 22, 2020, pp. 1-3.

(Continued)

*Primary Examiner* — Hang Pan
(74) *Attorney, Agent, or Firm* — Robert C. Kowert; Kowert, Hood, Munyon, Rankin & Goetzel, P.C.

(57) ABSTRACT

Artifacts, including parameters are data sets, associated with experiment tasks are stored at an experiment management service. A query specifying a particular value of a parameter and a particular data set is received, and an indication of an experiment result associated with the particular data set and the particular parameter value is provided.

20 Claims, 12 Drawing Sheets

Related U.S. Application Data

(60) Provisional application No. 62/940,800, filed on Nov. 26, 2019.

(51) Int. Cl.
    *G06F 18/2113*    (2023.01)
    *G06F 18/214*     (2023.01)
    *G06N 20/00*      (2019.01)
    *G06N 20/20*      (2019.01)

(56) References Cited

U.S. PATENT DOCUMENTS

| | | | |
|---|---|---|---|
| 11,586,847 B1 | 2/2023 | Thomas et al. | |
| 2013/0346356 A1 | 12/2013 | Welinder et al. | |
| 2014/0025412 A1* | 1/2014 | Chee | G06Q 10/063 705/7.11 |
| 2014/0040890 A1 | 2/2014 | Novak et al. | |
| 2014/0164964 A1 | 6/2014 | Cannon et al. | |
| 2016/0232457 A1 | 8/2016 | Gray et al. | |
| 2016/0300156 A1* | 10/2016 | Bowers | G06F 16/2465 |
| 2016/0358102 A1 | 12/2016 | Bowers et al. | |
| 2016/0358103 A1* | 12/2016 | Bowers | G06F 9/4881 |
| 2017/0264575 A1* | 9/2017 | Willshire | H04L 51/046 |
| 2018/0165604 A1 | 6/2018 | Minkin et al. | |
| 2019/0378052 A1 | 12/2019 | Badhwar et al. | |
| 2021/0019665 A1 | 1/2021 | Gur et al. | |
| 2021/0382813 A1 | 12/2021 | Moondhra et al. | |

OTHER PUBLICATIONS

Microsoft, "Experimentation Using Azure Machine Learning", Retrieved from https://azure.microsoft.com/en-us/blog/experimentation-using-azure-machine-learning/ on Apr. 22, 2020, pp. 1-18.

Matei Zaharia, "Introducing MLflow: an Open Source Machine Learning Platform", retrieved from https://databricks.com/blog/2018/06/05/introducing-mlflow-an-open-source-machine-learning-platform.html on Apr. 22, 2020, pp. 1-9.

Unknown, "Experiment tracking for deep learning", Retrieved from https://web.archive.org/web/20191112163309/https://www.wandb.com/ on Apr. 22, 2020, pp. 1-11.

SAS, "SAS Model Manager 15.1: User's Guide", SAS Documentation, Dec. 21, 2017, pp. 1-40.

* cited by examiner

Current leaderboard for Experiment E231

Primary metric: <Metric1> ← 802

Tie-breaking metric: <Metric2> ← 804

Change metrics ← 806

| Rank | Trial (click link for details) | Results timestamp | Metric1 | Metric2 | Trial initiator | Notes |
|---|---|---|---|---|---|---|
| 1 | Trial-20191104-JW ← 808 | 2019-11-05:09:07 | 0.973 | 0.65 | <User1> | Trying hyper-param H1 |
| 2 | Trial-XLM07 | 2019-11-06:04:00 | 0.969 | 0.75 | <User2> | - |
| 3 | Trial-JSL05 | 2019-11-03:14:55 | 0.957 | 0.74 | <User3> | Increased LR |
| 4 | Trial-XLM05 | 2019-11-06:06:00 | 0.952 | 0.75 | <User4> | - |

...

Auto-generated leaderboard interface 801

*FIG. 8*

EXPERIMENT MANAGEMENT SERVICE

This application is a continuation of U.S. patent application Ser. No. 16/894,707, filed Jun. 5, 2020, which claims benefit of priority to U.S. Provisional Application No. 62/940,800 filed Nov. 26, 2019, which are hereby incorporated by reference in their entirety.

BACKGROUND

In recent years, more and more large-scale machine learning applications and services are being deployed. Often, such applications are run using distributed sets of interconnected resources, for example in cloud-based data centers, thereby reducing the need for application owners to maintain expensive environments for training and execution of machine learning models at their own premises. In some cases, a sophisticated machine learning-based application or service may involve the use of multiple loosely-coupled repetitive processes or procedures, e.g., respective processes and associated teams may be employed for data collection, data cleansing and transformation, model training and evaluation, model deployment and so on. Often a large amount of effort and time has to be spent in coordinating the efforts of different teams involved, which can lower the overall productivity achieved for machine learning-based applications.

For many complex machine learning tasks, a continuous experimentation technique may be used, involving the iterative execution of numerous trials with different combinations of algorithms, hyper-parameters (which may also be referred to as meta-parameters) and resource configurations before a set of models that meets requirements is eventually found. Developers and data scientists may run hundreds or thousands of model training and tuning experiments, each of which may generate its own set of artifacts such as model versions, results, and so on. Over time, this explosion of data may make it harder to track the best performing models, observations and lessons learnt during the experimentation.

In some cases, related machine learning tasks may be performed using a combination of resources—e.g., preliminary experimentation may be performed using a data scientist's laptop or desktop environment, related tasks may be performed later using a machine learning service of a cloud provider network on behalf of the data scientist's organization, and still other tasks may be performed using a cluster of high-performance machines at the organization's non-cloud premises, and so on. Even within a given provider network, many different services, each presenting their own distinct interfaces, may have to be utilized to perform the experimentation required to solve a particular problem. Organizing and tracking all the data and metadata associated with such experiments remains a non-trivial technical problem.

BRIEF DESCRIPTION OF DRAWINGS

FIG. 8 illustrates an example leaderboard interface which may be supported by an experiment management service, according to at least some embodiments.

Figure 1:
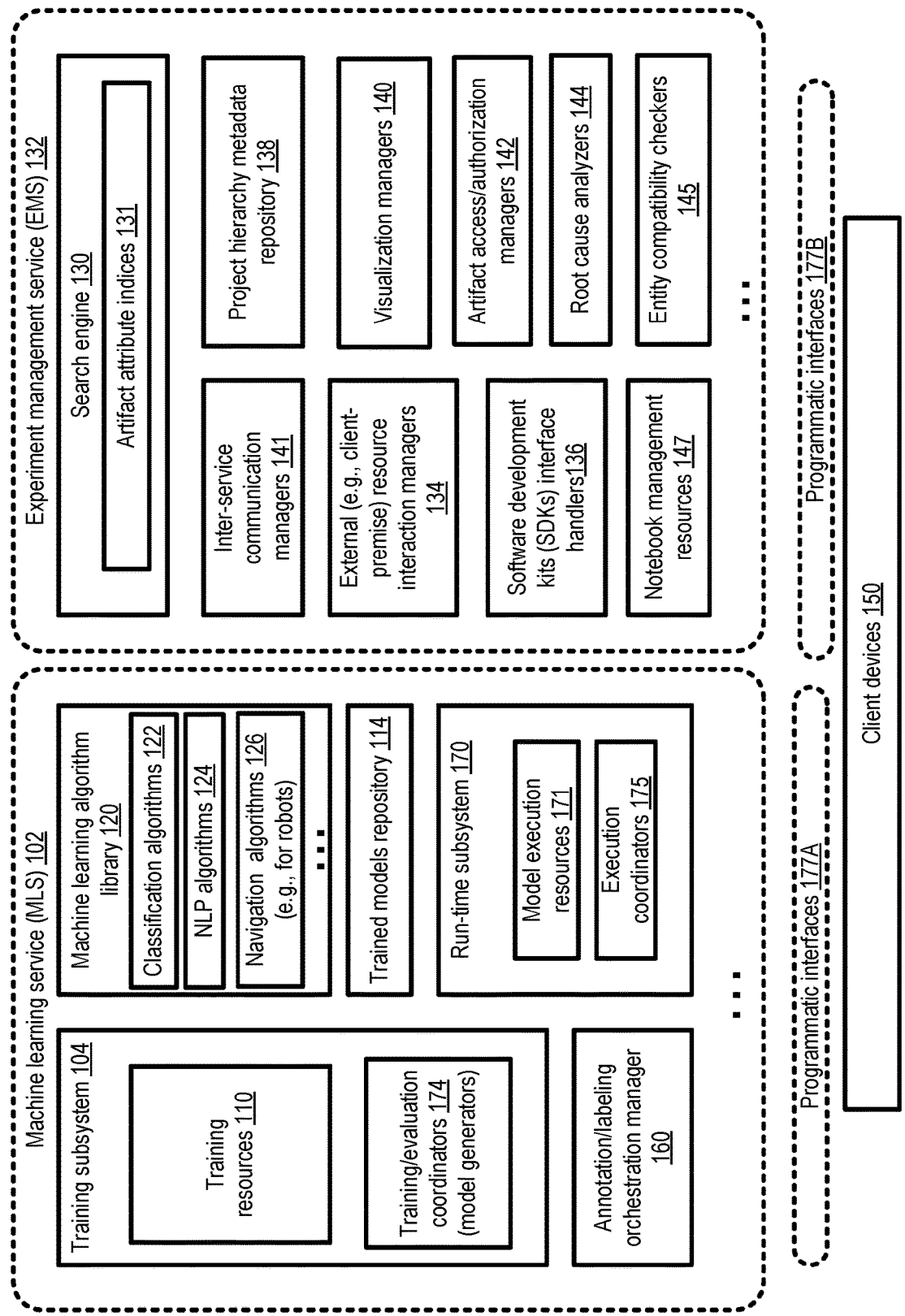
FIG. 1 illustrates an example system environment in which an experiment management service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a network-accessible experiment management service, which provides a common framework usable to store, access and compare metadata associated with various types of experiments including but not limited to experiments comprising machine learning tasks such as data set preparation, training or evaluating machine learning models and the like. In at least some embodiments, such an experiment management service (EMS) may be implemented as part of a suite of services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands.

These resources can be dynamically provisioned and reconfigured to adjust to variable load. In some embodiments, a provider network may include a machine learning service (MLS) in addition to the EMS (which may be used to manage experiments conducted using the MLS). In other cases, an EMS may be implemented as a lower level service or micro-service within an MLS.

An EMS may enable clients to store and access metadata of various types associated with related groups of experiments, view relationship information regarding the experiments, visually compare results and settings of different experiments, search for experiments based on a variety of attribute types, clone experimental artifacts and/or execution environments and so on in at least some embodiments. In at least one embodiment, a hierarchy of entity types may be supported at an EMS: for example, sharable workspaces called projects may be created by users, and information about one or more experiments may be stored within a given project. A given experiment in turn may comprise one or more preparation procedures, trials, and/or conclusion procedures, and a given procedure or trial may comprise one or more component steps. Thus, the set of first-class objects for which metadata may be stored at an EMS may include projects, experiments, trials, procedures and steps. Experiments, trials, procedures and the constituent steps of trials and procedures may be collectively referred to as tasks in some embodiments; in other embodiments, the tasks for which information is maintained at the EMS may represent other types of operations as well, such as budgeting, scheduling and other operations. A set of programmatic interfaces for performing various types of operations on instances of such entities may be supported in various embodiments, including CRUD (create, read, update and delete) interfaces, search interfaces, comparison interfaces, and so on. In some embodiments, one or more software development kits (SDKs) such as a Python SDK, a Java™ SDK, and the like, comprising a set of application programming interfaces (APIs) may be implemented by an EMS for operations on such entities. In at least one embodiment, other types of programmatic interfaces, such as web-based portals or consoles, graphical user interfaces, command-line tools and the like may also be provided, enabling EMS clients to submit various types of requests and receive corresponding responses.

In at least some embodiments, the set of related experiments for which metadata is stored at an EMS may comprise some experiments or operations that are conducted within a provider network at which the EMS is implemented, and other experiments or operations that are conducted outside the provider network—e.g., at specialized or high-end computing resources located at client premises, at a different cloud provider network, at data scientists' laptops, at a data annotator's computing devices, at laboratories equipped with sensors of various types, and so on. The EMS may provide a unified framework for viewing and comparing information about related experiments independently of the specific types of resources used for the experiments. Even within a given provider network, multiple services with respective interfaces may be used for different tasks of a given experiment—e.g., raw data sets for a machine learning model may be stored in an object storage service, cleansed and labeled data sets may be stored at a different storage service, training-related computations may be performed using one set of resources of a computing service or an MLS, the trained models may be deployed to a different set of resources, and so on. The EMS may enable data scientists and other users to access information about experiments of interest without having to worry about the differing interfaces of multiple provider network services. The EMS may provide lineage information about different versions of models or other experiment-related artifacts—e.g., indicating that model version V1 was an ancestor or antecedent from which model versions V2-V5 were derived, the key differences in hyper-parameters and other factors between the different versions, and so on.

In one embodiment, the EMS may perform or orchestrate version management tasks associated with experiment metadata—e.g., including enforcing of naming consistency for different versions of hyper-parameter files or model code, ensuring that the versions of such artifacts are backed up at high-availability storage servers of one or more storage services, and so on. In at least one embodiment, the EMS may utilize one or more domain-specific knowledge bases (e.g., a knowledge base about classification algorithms, another knowledge based about natural language processing algorithms, and/or a third knowledge base about pharmaceutical experiments) to respond to queries regarding the probable root causes of various observations or events—e.g., the EMS may be able to analyze the differences in hyper-parameters or environmental factors to provide a reasoned response to a query similar to "Why did model version X perform P % better than model version Y?". The EMS may also store information pertaining to resource usage or elapsed time with respect to various tasks in some embodiments—e.g., metrics such as CPU utilization, memory usage, network usage, disk space usage and the like, may be captured and stored at the EMS, enabling comparisons of tasks based from the resource consumption or time-to-completion perspective. In some embodiments, such metrics may already be collected as part of the normal procedures of running experiments, and the EMS may be responsible for storing pointers to the collected metrics and including them in its metadata regarding the experiments. In other embodiments, the EMS may initiate the collection of at least some of the resource consumption-related metrics, automatically generate and store timestamps corresponding the start and end of various tasks, and so on.

In some embodiments, EMS may also enable users to more easily utilize specialized debugging and/or profiling services for machine learning tasks (e.g., for deep learning) which may be implemented at a provider network. For example, a single click in an EMS user interface may open up a debugging window and/or present profiling information about one or more models obtained with the help of such other services. In one embodiment, the provider network may support a visually-oriented workbench for machine learning, and the EMS may utilize the workbench for some of the metadata or data presented to EMS users, or to act as a front-end for debugging and profiling tasks performed using a specialized service of the kind mentioned above. In some embodiments, the EMS may present interactive machine learning notebook interfaces to its users (e.g., as part of the workbench), with a dynamically provisioned server-less computing service of the provider network being used to implement the notebook interfaces. Notebook interfaces may, for example, automatically incorporate or load various machine learning, statistics and other types of libraries into an interactive development and experimentation environment (thereby reducing the amount of work that has to be done by data scientists or other users to view or rearrange data sets, experiment with models or data analysis steps and so on), provide easy-to-use annotation capabilities which data scientists can use to record and share comments, suggestions, and the like.

As one skilled in the art will appreciate in light of this disclosure, certain embodiments may be capable of achieving various advantages, including some or all of the following: (a) substantially improving the user experience of data scientists and other experimenters by providing a common easy-to-use framework for organizing and viewing experiment artifacts and comparing experiments from several different perspectives, as well as by providing tight integrations with provider network services such as machine learning services, debugging services, data storage services, workflow management services and the like; (b) improving the overall quality of machine learning solutions by making it easier to reproduce (and thereby validate) or invalidate results obtained in earlier experiments, (c) automating and streamlining the coordination of experiment-related operations performed at multiple provider network services (e.g., machine learning services, parallel computing services used for pre-processing data sets, storage services at which experiment metadata versions are stored, and the like); and (c) reducing the total amount of resources consumed for generating high quality machine learning models by reducing the probability of duplicated or redundant experiments and by providing clear insights into the factors that result in the largest quality improvements (which can then be applied to other experiments).

According to some embodiments, a system may comprise one or more computing devices. The devices may include instructions that upon execution on or across one or more processors cause the one or more computing devices to store, in response to one or more requests obtained via programmatic interfaces of an EMS, metadata indicating that a group of machine learning tasks are related. The group of tasks may, for example, comprise an experiment which includes one or more trials using respective versions of one or more machine learning models, and metadata indicating the temporal relationships between the trials may be stored. In some embodiments, different tasks of the group may be performed using respective resources of one or more provider network services—e.g., at least one machine learning task of the group may be performed using resources of a storage service of a provider network, at least one machine learning task of the group is performed using resources of a computing service of the provider network. In some cases, a given task may be performed using multiple services in combination.

The EMS may store respective records of artifacts associated with individual ones of the machine learning tasks of the group at one or more repositories, including for example indications of the respective versions of the machine learning models, results obtained using the respective versions, and/or hyper-parameters associated with the respective versions. In some embodiments, the EMS may store pointers to or addresses of the artifacts, and the artifacts may be stored elsewhere (e.g., at a storage service or a computing service); in other embodiments, the EMS may store the artifacts at the EMS's own resources. In response to one or more programmatic queries, the EMS provide an indication of one or more of: a change in model quality achieved between a first and a second version of a machine learning model utilized in the group of machine learning tasks, an indication of respective resources consumed for individual machine learning tasks of the group or ancestor-descendant relationships between at least one pair of versions of machine learning models utilized in the group of machine learning tasks. In some embodiments, an EMS may automatically capture results and performance metrics and/or quality metrics during various trials and other experiment related tasks (e.g., based on hints provided by EMS clients, or based on contents of a knowledge base about various kinds of metrics collected/utilized in earlier experiments).

In one embodiment, at least some of the tasks for which metadata is stored at an EMS may include a preparation procedure such as data record labeling or cleansing/reformatting. A metadata artifact associated with a labeling procedure, which may be stored at the EMS or pointed to by the EMS, may indicate one or more of: a source of unlabeled records used as input for the labeling, annotators responsible for labeling at least a subset of the records, and/or one or more metrics associated with labeling one or more records. In at least one embodiment, an experiment or trial for which metadata is stored at the EMS may be performed using a client computing device (e.g., a desktop, laptop, portable computing device, or the like) which is not part of a provider network, other trials may be performed using an interactive notebook interface implemented by an MLS, and yet other trials may be implemented using servers managed by or allocated for the MLS.

According to some embodiments, data scientists or other users involved in the experiments may generate free-form or unstructured notes or annotations (including comments, explanations, goals and the like), and such notes or annotations may be included in the artifacts managed by the EMS. In other embodiments, instead of or in addition to unstructured text annotations, some notes may be stored in a structured format, e.g., as attributes within a database table or similar storage object accessible from the EMS.

In one embodiment, the EMS may support a notification mechanism, such that if and when an artifact associated with a given project or experiment is accessed (or an access to an artifact is attempted but disallowed), one or more users or groups of users may be notified regarding the access, and/or one or more log records accessible from the EMS may be generated. Such mechanisms and other similar access controls implemented by the EMS may help ensure the security of certain types of models and the associated data sets in various embodiments. The logging capability may be useful in meeting various types of regulatory compliance or auditing requirements in at least some embodiments. In some embodiments, a requirement to accurately identify the data sets used to develop a given model or experiment, e.g., for result reproducibility testing, may have to be satisfied, and metadata generated, tracked and logged at the EMS may be useful in meeting such requirements.

The EMS may enable clients to obtain various types of comparisons between tasks in some embodiments. For example, a client may request, via one of the EMS's programmatic interfaces, an indication of the differences between a pair of trials, and the EMS may provide a summary of the differences between the trials with respect to hyper-parameters, other tuning-related settings, the differences in results, differences in other properties such as resource consumption or elapsed time, trial initiators' identities, the times at which the trials were initiated, and so on. In some embodiments, the EMS may automatically capture metrics generated at one or more types of machine learning packages or frameworks such as SciKit-learn, MXNet, PyTorch and the like which may be used for experiments, without requiring EMS users to specify that such metrics are to be collected. As such, the EMS may provide seamless integrations with instrumentation features of a variety of other services or frameworks and support presentation of comparisons of data collected using such instrumentations. In one embodiment, the EMS may also be integrated with one or more source code management repositories, including repositories accessible over the public Internet, at which various experiment artifacts may be stored. In some embodiments, the EMS may utilize one or more workflow management services of the provider network (or third party workflow management services, public domain workflow management services and the like) to implement a sequence of experiment management tasks—e.g., a workflow for collecting metrics, generating a visualization data set, and displaying the data set may be implemented using such a workflow management service. In some embodiments, experimenters such as data scientists may use such workflow services for their experiments, and the EMS may use interfaces provided by such workflow services to gather information such as task start and stop timestamps as well as other metadata.

According to at least one embodiment, an EMS may provide interfaces allowing clients to clone at least some of the artifacts associated a particular task such as a trial—e.g., a version of the model used for the trial may be replicated, an input data set may be replicated, and so on. Such cloning may enable tests for repeatability of results to be conducted, for example. In some embodiments, the EMS may replicate not just artifacts, but an execution environment (e.g., by acquiring computing resources, storage resources, memory and the like from one or more provider network services) which were used for a particular task, so that the task may in effect be re-run if desired in an environment which id identical (or at least very similar) to the environment which was used earlier.

In some embodiments, the EMS may provide a default set of visualizations indicative of the results of a task such as a machine learning training trial. The specific sets of metrics and/or graphs used for the default visualizations may be selected by the EMS based at least in part on the kind of machine learning model being used in such embodiments—e.g., one set of default graphs may be provided for a classification model training trial, while a different set of default graphs may be provided for a natural language processing model trial. Clients of the EMS may be provided mechanisms for modifying or customizing the visualizations in one embodiment, e.g., by providing quick access to the source code used for the default virtualizations, by providing access to an interactive notebook interface of the kind commonly used by data scientists, and so on. In various embodiments, an interactive leader-board interface may be presented automatically to EMS clients indicating, from among a group of related models, which specific models rank higher than others according to one or more criteria. The EMS clients may change the metrics used for the ranking in some implementations if desired. Generally speaking, for machine learning model training or tuning experiments, the artifacts for which metadata is tracked/stored at an EMS may include, among others: training, validation and test data sets, algorithms (which may be encapsulated within software containers in some embodiments), hyper-parameters, source code, platform configurations (such as compute instance type or cluster specifications), experimental output including training quality metrics, logs, standard output (stdout) streams, images, output files, and the like. In addition annotations or notes indicating, among others, founding goals and objectives of an experiment, descriptions of hypotheses being tested, decisions related to experimental setup, evidence regarding which experiment tasks were performed when and by whom, and observations or comments made by the experimenters or others during the course of the experiments may be retained at the EMS. In some embodiments, the EMS may generate read-only or immutable snapshots of various artifacts (such as datasets), hash values or checksums which can be used to ensure artifact integrity and so on. Other services of the provider network (such as software container services, source code repository services, software development/deployment services and the like) or services outside the provider network (e.g., source code repositories accessible via the public Internet) may be used to manage artifact versioning (e.g., using commit identifiers of code check-ins, tags etc.), snapshot creation and the like in some embodiments.

An EMS may include one or more sophisticated search engines in various embodiments, which may be used by clients to find entities and/or artifacts of interest. Using such an interface, in one example scenario, a client may indicate a particular data set, and one or more model versions which were trained or evaluated using the data set may be identified. In another example search scenario, an EMS client such as a data scientist may enter the name of a particular algorithm or version of an algorithm, and identify the set of model versions which utilized that particular algorithm or version. Similarly, models/trials which utilized a particular value of a hyper-parameter (such as a specific learning rate or a specific dimensionality of a neural network layer) may be identified using the search engine in at least some embodiments.

In at least one embodiment, an EMS may provide an indication of one or more potential causes of a change in results from one trial to another. In one implementation, the EMS may rank the possible causes relative to one another, with the most probable cause ranked first. Note that although much of the description herein uses machine learning tasks as example, in at least some embodiments an EMS may be used to manage artifacts associated with experiments that do not necessarily utilize machine learning, such as biological experiments, human health or pharmaceutical related experiments, chemistry experiments, web site experiments (e.g. A/B tests for different versions of web sites), so-called Bandit tests, and so on. In one such embodiment, domain-specific programmatic interfaces may be implemented for each type of problem domain (e.g., biological experiments, chemistry experiments, etc.) for which metadata is to be tracked and/or stored at the EMS. In other embodiments, a domain-agnostic set of interfaces may be used.

Example System Environment

FIG. 1 illustrates an example system environment in which an experiment management service may be implemented, according to at least some embodiments. As shown, system 100 includes resources and artifacts of a network-accessible machine learning service (MLS) 102, as well as a network-accessible experiment management service (EMS) 132. The EMS 132 may be optimized to manage metadata associated with machine learning tasks implements at the MLS 102 in the depicted embodiment, although metadata for experiments that do not involve machine learning may also be managed with similar success using the EMS 132. In some embodiments, an EMS similar in features and functionality to EMS 132 may be implemented as a subcomponent of an MLS 102.

The MLS 102 and the EMS 132 may implement a respective set of programmatic interfaces 177A and 177B in the depicted embodiment, such as one or more web-based consoles, graphical user interfaces, command-line tools, application programming interfaces (APIs), and the like, which may be used by clients of the services (such as data scientists and the like) to interact with the services. Users may submit programmatic requests via interfaces 177A and 177B from client devices 150 (e.g., laptops, desktops, mobile computing devices and the like) and receive corresponding responses.

The MLS 102 may include a training subsystem 104 as well as a runtime subsystem 170 at which trained models may be run in the depicted embodiment. A variety of algorithms may be included in a machine learning algorithm library 120, for example classification algorithms 122, natural language processing (NLP) algorithms 124, navigation algorithms 126 (e.g., for robots and other autonomous or semi-autonomous devices), and so on. One or more training and evaluation coordinators 174 (also referred to as model generators) implemented at a set of computing devices may utilize training resources 110 (e.g., compute engines including CPUs, GPUs and the like, as well as storage, memory and networking resources) to train machine learning models using algorithms from library 120 in the depicted embodiment. As part of the preparation for model development, in at least some embodiments a subset of data sets may be identified for annotation. In one embodiment, the MLS 102 may act as a repository of information about available annotators which can be used to label data records—for example, individuals wishing to provide annotation services may register with annotation orchestration managers 160, and the orchestration managers may provide information about such individuals to other clients who may utilize the annotators to label records for their supervised machine learning models. Automated annotators (e.g., machine learning models trained to generate labels for at least some data records) may be used in some embodiments, and indications of such annotation programs and/or human annotators used for labeling data for various tasks may be stored at the EMS. Once a model has been trained to a desired level of quality using algorithms from library 120, it may be stored in a repository 114 of trained models. Execution coordinators 175, implemented at one or more computing devices, may run trained versions of the models using model execution resources 171 and provide results obtained from the models to clients and/or other destinations in the depicted embodiment.

The EMS 132 may enable its clients to organize and compare machine learning-related tasks using a hierarchy of entities organized into sharable workspaces called projects in the depicted embodiment. For example, a given project may contain information about a number of related experiments, a given experiment may include some number of preparation procedures followed by some number of trials, and so on. Repository 138 may comprise metadata about the entity hierarchy for various projects, including information about instances of the entities, associated artifacts, containment relationships (e.g., which experiment contains which trials), temporal relationships, as well as lineage or ancestor-descendant relationships (e.g., whether the model version used in trial T7 of an experiment is derived from the model version used in trial T2, or whether the model version used in trial T7 was derived from the model version used in trial T4), and so on. Such information may be presented to EMS clients in response to programmatic requests received via interfaces 177B.

EMS 132 may include a search engine 130 which can be used by clients to find artifacts and entities based on numerous types of search criteria in different embodiments. For example, a client may be able to search for information based on specified entity types or project hierarchy levels, machine leaning model types, model owners/creators, entity or model creation times, most recent modification times for entities or models, the set of services or resources used, the specific data sets used, hyper-parameter values, annotation text associated with the entities or models, and so on. A client may very easily identify all the model versions that used portions or all of a given training data set, for example, or all the trials in which a hyper-parameter value was set to a particular value, or all the trials which used a particular neural network based algorithm in one or more projects to which the client is granted access. Search indices 131 may be constructed on numerous attributes of the artifacts accessible from or managed with the help of the EMS 132 in the depicted embodiment to help speed up search query responses.

In at least some embodiments, multiple network-accessible services (not just the MLS 102) may be employed to perform tasks for which metadata is managed at the EMS 132—for example, some types of computations may be performed using a virtualized computing service, data sets may be stored at various storage services, and the like. An inter-service communication manager 141 may be responsible for accessing, collecting and normalizing data from the different services used for a given project to present a simplified and unified view of the artifacts to EMS users. In some embodiments, some of the tasks managed using the EMS may be conducted using resources outside a provider network at which the EMS and the MLS are implemented, and external resource interaction managers 134 may be configured to communicate with such resources to obtain the information needed by the EMS clients. The inter-service communication managers 141 and/or external resource interaction managers 134 may participate in the cloning of execution environments for machine learning tasks in some embodiments—e.g., to acquire computing platforms similar to the ones used for a particular machine learning task that has been completed, an inter-service communication manager may send a request to the MLS 102 and/or to a virtualized computing service. In at least some embodiments, in addition to cloning execution environments, the EMS may automatically initiate the execution of tasks in the cloned environments if desired—e.g., a client may request the equivalent of "clone the environment and artifacts used for trial T1 of experiment E1, and re-train the model which was trained in trial T1", and the EMS may perform the requested operations.

According to at least some embodiments, a number of different types of programmatic interfaces may be supported at an EMS, including for example one or more SDKs (software development kits) in respective programming languages such as Python. SDK interface handlers 136 may be responsible for processing requests submitted via the SDK in the depicted embodiment. Interactive interfaces referred to as notebooks (e.g., Python-based notebooks) may also be offered by the EMS in some embodiments, enabling data scientists and other clients to annotate various aspects of machine learning tasks, and the EMS 132 may include notebook management resources 147 for such clients. In some implementations, client requests submitted via a notebook interface may be translated into SDK requests and handled internally by the SDK interface handlers 136.

The EMS 132 may include one or more visualization managers 140, responsible for operations such as deciding the types of graphs or tables is to be generated by default for various machine learning tasks (such as model training or evaluation), populating data sets for such default visualizations, and causing the visualizations to be presented via interactive graphical elements of user interfaces 177B to EMS clients. Artifact access/authorization managers 142 may enforce access control rules, ensuring for example that sensitive data sets or sensitive model results can only be provided to authorized clients or users. In at least some embodiments, the authorization managers 142 may also enable clients to set up notifications regarding future accesses (or attempted accesses) to one or more artifacts. For example, the authorization managers 142 may implement logic similar to the following: "if an access request directed to any artifact associated with a model version M1 is received (a) log the access request, (b) provide a notification to the owner of model version M1 and (c) reject the access request."

In at least some embodiments, the EMS may be capable of performing at least some level of causal analysis, e.g., to help with debugging or explanation of results or errors obtained from one or more model versions. Root cause analyzers 144 may themselves comprise machine learning models for causal analysis, which may in turn make use of one or more knowledge bases to respond to queries such as "why did model version M34 produce results worse than model version M33 on which M34 is based" or "why did model version M67 throw error E1 during training iteration 14 of trial T23?".

According to at least some embodiments, an EMS client may submit a programmatic request to include a trial within a given experiment, or to move a trial from one parent experiment to another. Entity compatibility checkers 145 may perform one or more types of validation checks to determine whether the requested operation is acceptable— e.g., if a request to include a trial involving a model for object recognition is received, and all the other trials in the target experiment are about natural language processing, the requester may be informed that the inclusion of the trial into the target experiment does not meet compatibility criteria. Individual ones of the components of the EMS shown in FIG. 1, including the search engine, the inter-service communication managers 141, the interaction managers 134, the visualization managers 140, the SDK interface handlers 136, the notebook management resources 147, the access/authorization managers 142, the root cause analyzers 144, and/or the entity compatibility checkers 145, may be implemented using one or more computing devices in various embodiments. The components of EMS 132 may communicate with the components of the MLS 102 to perform various tasks requested by EMS clients in some embodiments—e.g., to determine the locations of trained versions of models, training results, hyper-parameter values, and so on.

In various embodiments, the EMS may store metadata in repository 138 indicative of relationships between groups of related machine learning tasks, including one or more trials of one or more experiments. Some of the tasks may involve the use of other services, such as the MLS 102, storage services, computing services and the like. Records of artifacts associated with the tasks may be stored, e.g., also in repository 138 in some embodiments, including such artifacts as the code for different model versions used in the tasks, input and output data sets, results and hyper-parameters used, and so on. In some embodiments, the records in repository 138 may comprise pointers to the actual artifacts, which may be stored elsewhere; in other embodiments, at least some of the artifacts themselves (such as annotations or notes made by data scientists) may be stored within the repository 138 itself. In response to programmatic requests or queries, indications of changes or differences between instances of various entities, such as changes in model quality between respective model versions used in a pair of trials or changes in hyper-parameters may be provided. Indications of the amount of resources consumed during various tasks, and/or ancestor-descendant relationships between model versions may also be provided in at least some embodiments.

Example Entity Types

Figure 2:
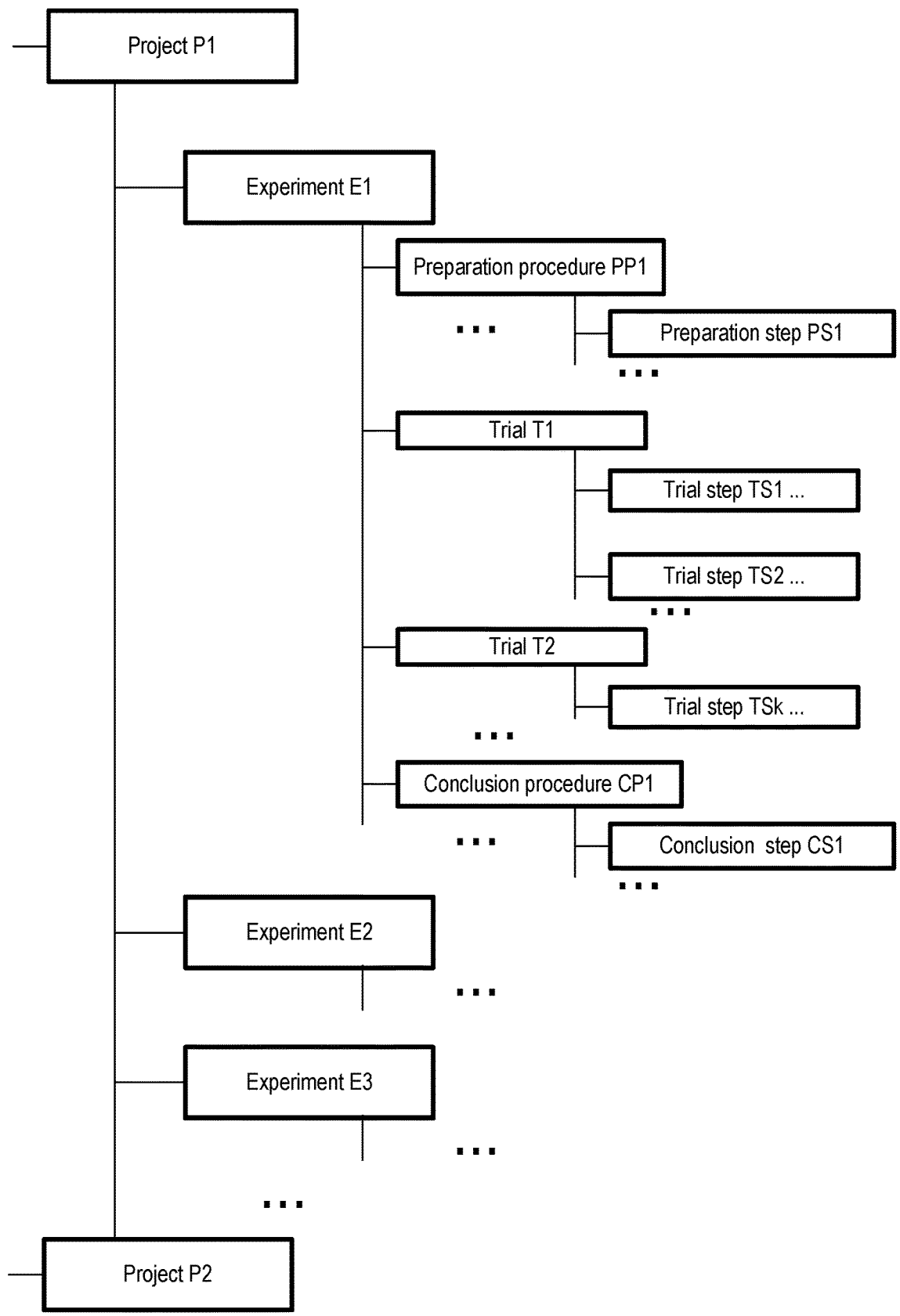
FIG. 2 illustrates example experiment-related entity types for which relationship and other metadata may be stored at an experiment management service, to a child compute instance, according to at least some embodiments.

FIG. 2 illustrates example experiment-related entity types for which relationship and other metadata may be stored at an experiment management service, to a child compute instance, according to at least some embodiments. Sharable workspaces called projects such as projects P1 and P2, represent the highest-level containers of experiment-related information managed using the EMS in the depicted embodiment. A given project may be shared among a group of data scientists or developers working on a common problem, for example. Invitations to other EMS users to join a project (e.g., to be granted authorization to create and view information about the project's contents) may be sent in the form of web links using the EMS programmatic interfaces in some embodiments. Projects may be used to group experiments by research goals, data science teams, business/product/service organizations and/or other factors in different embodiments. The project hierarchy may be presented to EMS users in a file-system or folder-like view in at least one implementation. In at least one embodiment, a timeline view with respect to all the changes performed within a project (e.g., new experiments/trials being created or deleted, etc.) may be presented via an EMS interface.

A given project may comprise one or more experiments in the depicted embodiment. For example, project P1 comprises experiments E1, E2 and E3. Individual ones of the experiments may deal with a respective facet of the problem for which the project was set up in the depicted embodiment, or may use different kinds of machine learning models to address the same facet of a problem.

A given experiment may include zero or more preparation procedures, trials and/or conclusion procedures in some embodiments. For example, experiment E1 comprises preparation procedure PP1, trials T1 and T2, as well as conclusion procedure CP1 as shown in FIG. 2. Preparation procedures such as PP1 may, for example, include acquisition of raw data sets, normalization and cleansing of the data sets, labeling a subset of the data sets if supervisory machine learning is being used, and so on. Conclusion procedures such as CP1 may include, for example, deploying one or more models to production environments, ensuring that none of the input data remains accessible to potentially unauthorized users (e.g., by deleting storage devices or compute instances), and so on. The trials such as T1 and T2 may include, for example, model training runs, evaluations, and so on. In some embodiments, model deployment tasks (e.g., tasks which involve the transfer of software containers comprising all the artifacts necessary to run a model version) may also be included among the first-class entity types managed with the help of the EMS, and deployment may not necessarily be represented using a conclusion procedure.

Preparation procedures, trials, and/or conclusion procedures such as CP1 may be further subdivided into respective workflows if desired, each of which include one or more steps in some embodiments, such as preparation step PSi, trial steps TS1, TS2 and TSk, and conclusion step CS1. In some embodiments, a workflow management service implemented at the provider network at which the EMS is implemented may be used to design and implement the workflows that include the preparation, trial or conclusion steps.

In at least some embodiments, instances of each of the entity types shown in FIG. 2 may be treated as first-class objects at the EMS, and separate programmatic interfaces for creating, reading/accessing, updating and deleting instances of each of the entity types may be implemented. In various embodiments, an EMS user may enter notes (e.g., in unstructured text, as part of structured database or spreadsheet-like records, or as attachment documents including test, image or mixed-media documents) associated with any instance of any of the entity types via programmatic interfaces. Such notes may be retained by the EMS as part of the metadata pertaining to the project hierarchy, and indexed by the search engine of the EMS. Such notes may include, for example, objectives, insights, comments, observations, and so on. In at least some embodiments, the EMS may provide a notes-focused view of a project—e.g., all the notes stored for the various entities contained in a project may be presented in chronological order, or sorted using other criteria such as the authors of the notes. In at least some embodiments, the notes of a project may be edited collaboratively—e.g., one authorized user may comment on or modify a note made by another authorized user. In one embodiment, the entity types supported at an EMS may be extendable, e.g., subtypes such as MachineLearningExperiment or GeneticsExperiment may be defined from the parent Experiment type.

Example Programmatic Interactions

Figure 3:
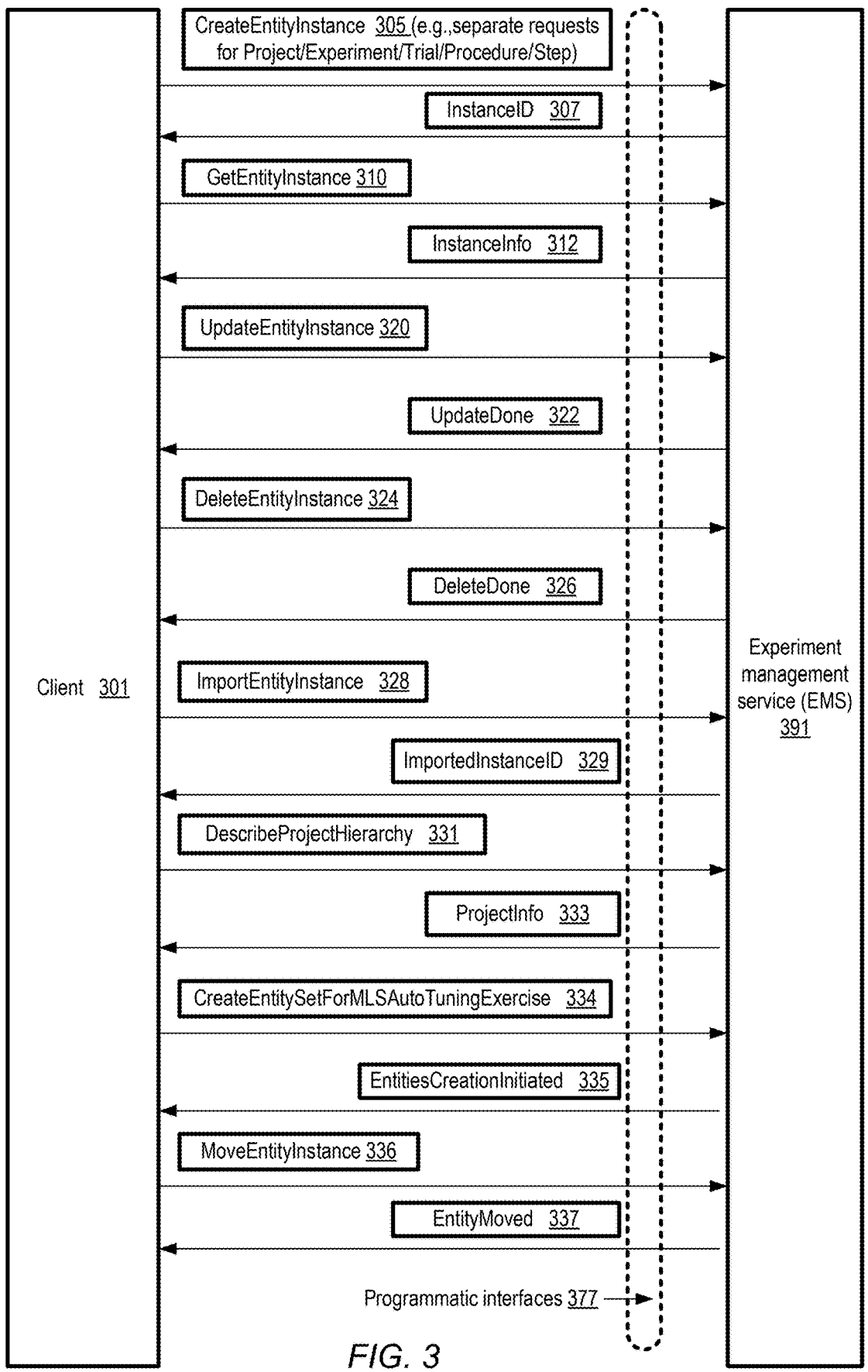
FIG. 3 and FIG. 4 collectively illustrate examples of programmatic interactions with an experiment management service, according to at least some embodiments.
Figure 4:
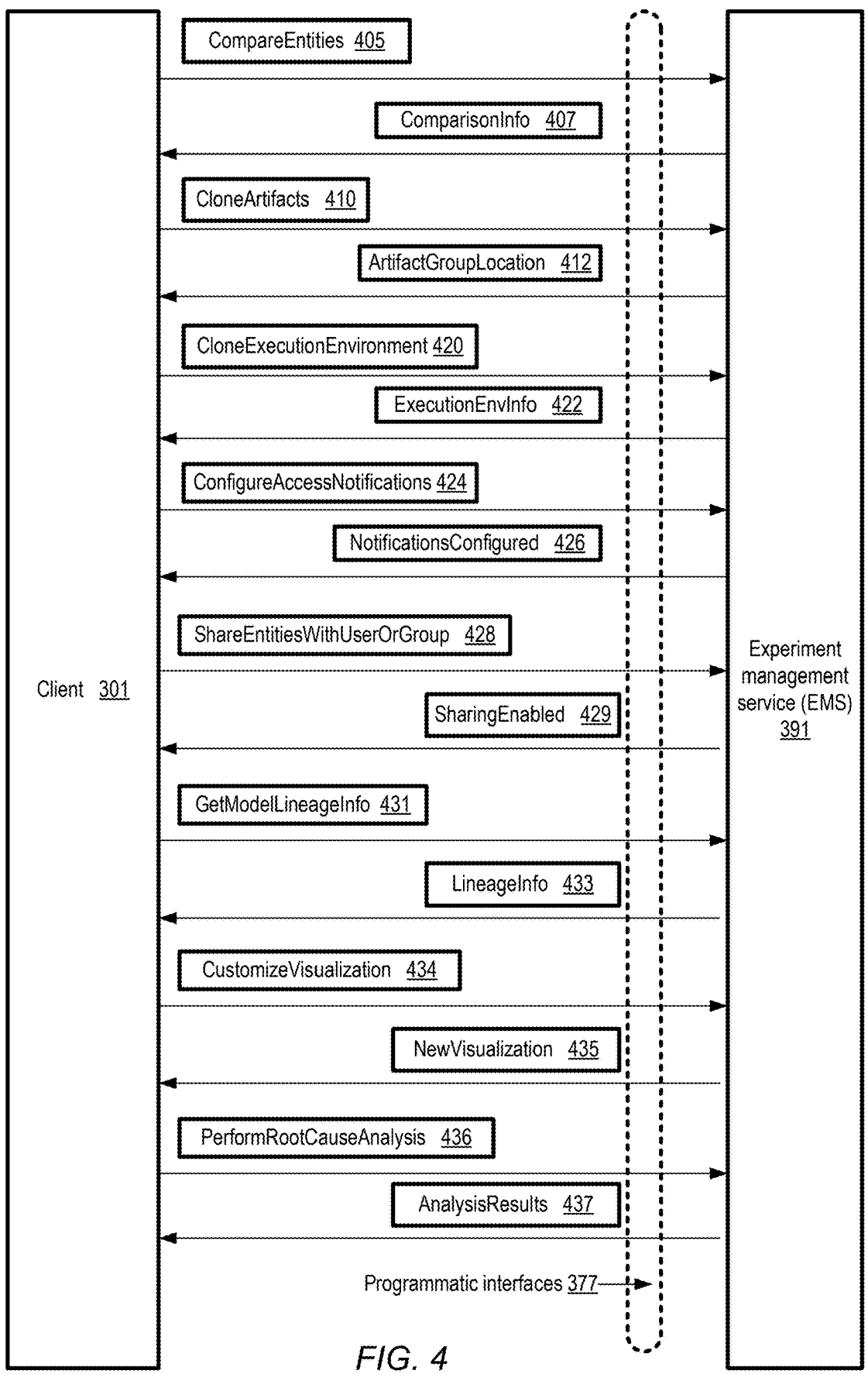

FIG. 3 and FIG. 4 collectively illustrate examples of programmatic interactions with an experiment management service, according to at least some embodiments. An experiment management service (EMS) 391, similar in features and functionality to EMS 132 of FIG. 1, may implement a set of programmatic interfaces 377 in the depicted embodiment, which may be used to clients 301 to submit requests for various operations related to a project hierarchy and receive corresponding responses. The programmatic interfaces may include, for example, a set of APIs, web-based consoles or portals, command line tools, graphical user interfaces and the like in different embodiments.

For individual ones of the entity types discussed in the context of FIG. 2, respective requests to create, read, update and delete instances of the entity type may be submitted by clients 301 in the depicted embodiment. A CreateEntityInstance request 305 may be submitted for any of the entity types (such as project, experiment, preparation procedure, trial, conclusion procedure, or step within a trial or procedure), and an identifier of the created instance or object, for which metadata is stored at the EMS, may be provided in an InstanceID response message 307. The specific type of entity may be specified as a parameter in the CreateEntityInstance request in some embodiments, while in other embodiments separate request signatures or names may be used for the different entity types (e.g., requests such as CreateProject, CreateExperiment, etc. may be supported). For subordinate or lower-level entities than projects, entities, an indication of the parent or container entities may be indicated in the create requests 305—for example, when a request to create an experiment is submitted, its parent project may be specified by name or identifier, and when a request to create a trial is submitted, its parent experiment may be indicated, and so on.

Read accesses for instances of the entity types may be requested via GetEntityInstance requests 310, and information about the attributes and/or contents of the specified instance may be provided in an InstanceInfo response 312. A client may request a modification of one or more attributes of an instance by submitting an UpdateEntityInstance request 320, and the EMS may transmit an UpdateDone response 322 after the requested changes have been made. Instances of the different entity types may be deleted at the EMS in response to DeleteEntityInstance requests 324, and a DeleteDone message 326 may be transmitted in response. In some embodiments, as with Create requests, respective Get, Update and/or Delete requests, one for each of the entity types or first-class object types (projects, experiments, procedures, trials and steps) may be required instead of generic Get, Update and Delete requests applicable to any of the entity types.

An ImportEntityInstance 328 request may be submitted to import an instance of an entity (e.g., an experiment or a trial) into an existing project hierarchy from a source location in some embodiments. For example, for certain kinds of jobs for which requests were submitted to a machine learning service (MLS), the EMS may enable incorporation of the jobs into a project hierarchy as respective experiments or trials, and the identifiers of the jobs may be provided as parameters of the ImportEntityInstance requests. In response, the metadata for the requested entities may be populated within the EMS using one or more communications with the MLS, and an ImportedInstanceID message 329 may be sent to the client.

A DescribeProjectHierarchy request 331 may be submitted to obtain information, in a file system or folder-like format, regarding all the contents of a particular project. The requested information may be transmitted in a ProjectInfo response message 333 in the depicted embodiment.

In some embodiments, an MLS with which the EMS is compatible may support various types of automated model tuning exercises, in which for example hyper-parameter values are varied within specified ranges and the corresponding results are obtained from a model. Using a CreateEntitySetForMLSAutoTuningExercise request 334 may be submitted by a client to the EMS 391, e.g., to automatically create corresponding trials for each of the hyper-parameter combinations tried in such an automated tuning exercise. In some embodiments, sequences of other types of automated machine learning training/evaluation/tuning operations may also be represented automatically as trials or experiments within the project hierarchies of the EMS as a result of client-submitted programmatic requests. An EntitiesCreationInitiated message 335 may be sent to the client to indicate that the EMS has started representing the automated operations via respective entities in the depicted embodiment.

Instances of trials, experiments, and the like may be moved within the project hierarchies of the EMS in some embodiments in response to MoveEntityInstance requests 336 submitted via programmatic interfaces 377. For example, an experiment may be moved from one project to another, or a trial may be moved from one experiment to another. In some embodiments, the EMS may perform some level of validation to ensure that the move or transfer does not break compatibility requirements—e.g., it may not necessarily make sense to move a trial of a binary classifier into an experiment in which all the other trials pertain to natural language processing models. In some embodiments the EMS may flag such incompatible move requests and/or disallow such incompatible requests or ask the client for confirmation before moving the entity instance and sending an EntityMoved message 337 as an acknowledgement.

One or more types of comparison operations may be performed at an EMS in response to a CompareEntities request 405 (indicated in FIG. 4). A CompareEntities request may indicate, for example, that a visual representation of a comparison of the results obtained in a pair of trials (or more than two trials) should be provided, or that the hyper-parameter values used in the trials should be compared. In response, the requested types of comparison may be performed, and the results of the comparison may be provided via one or more ComparisonInfo messages 407 (which may be displayed via a graphical user interface in some embodiments).

Several different types of cloning operations may be supported at an EMS in some embodiments. For example, a CloneArtifacts request 410 may be submitted to generate a copy of a specified set of artifacts of a trial or experiment (e.g., a copy of the machine learning model version used, files containing hyper-parameter settings, and so on), and the cloned or copied artifacts may be indicated via an Artifact-GroupLocation response message 412. If a client 301 wishes to not just obtain an exact copy of the artifacts, but also replicate the resources and runtime environment in which a trial or experiment was conducted, a CloneExecutionEnvironment request 420 may be submitted. In response, the EMS may attempt to acquire resources, e.g., from one or more services of a provider network, which are equivalent (in terms of performance and functional capacities) to the resources that were used for the environment to be cloned. If the resources are successfully acquired, an ExecutionEnvInfo message 422 may be sent to the client. In some embodiments, as mentioned earlier, some machine learning tasks of a project hierarchy may be performed using resources external to a provider network (e.g., resources at a client's data center or office premises). In such a scenario, it may not be possible to exactly replicate the execution environment using provider network services, and the EMS may attempt to identify a set of resources that are very similar to (but may not exactly replicate) the original execution environment in some embodiments. In other embodiments, cloning of execution environments may only be supported for a restricted set of source (i.e., to-be-cloned) execution environments which were configured using provider network services to which the EMS has access.

In some embodiments, a client 301 may wish to be notified if/when a specified set of artifacts associated with a project hierarchy is accessed (or an attempt to access such artifacts is made). A ConfigureAccessNotifications request 424 may be submitted to facilitate such notifications. The EMS may perform the needed configuration operations (e.g., by setting up access watch events, or by setting up artifact-specific triggers in authorization or access management components), and send a NotificationsConfigured response message 426 in the depicted embodiment.

EMS clients may enable access to portions or all of a project by submitting a ShareEntitiesWithUserOrGroup request 428 in some embodiments. In one implementation, a web-link to the entities may be provided to the user or group with which access is to be shared. A SharingEnabled response 429 may be sent to the client when permissions have been modified to allow access to the to-be-shared entities.

To obtain information about the logical relationships between various machine learning models used in a set of experiments, a GetModelLineageInfo request 431 may be submitted in the depicted embodiment. In response, an indication of the ancestors and/or descendants of a specified model (e.g., versions of the model from which the specified version was derived by changing hyper-parameters, algorithms, tuning parameters, or resources, and/or versions which were derived from the specified version via similar types of changes) may be provided via a LineageInfo response 433.

In some embodiments, as indicated earlier, the EMS 391 may prepare a default set of visualizations for results of one or more types of machine learning tasks. A CustomizeVisualization request 434 may be submitted to, for example, modify the default graphs that are displayed, change the axes scales, zoom in or out into regions of interest within the graphs, create new graphs, delete graphs and the like. In some embodiments, the EMS may provide access to the source code (e.g., via a machine learning notebook interface) used for the visualization, which may then be modified by the client if desired. A NewVisualization message 435 may be sent by the EMS to display the modified visualization in at least some embodiments. In at least some embodiments, at least some of the computations performed to generate the visualization data sets may be performed using a server-less computing service of a provider network. In such a service, resources such as physical or virtualized computing servers may not have to be provisioned or allocated in advance. Instead, when a particular type of computation is to be performed, an indication of the computation (e.g., a function or program) may be submitted to the service, resources may be provisioned dynamically to execute the computation, and results may be provided to the submitter of the computation (e.g., an EMS visualization manager).

According to one embodiment, an EMS may be able to perform causal analysis, e.g., using its own machine learning models, one or more knowledge bases and the like, to explain various aspects of results or errors encountered in one or more tasks whose metadata is managed using the EMS. A PerformRootCauseAnalysis request 436 indicating the event or observation to be investigated may be submitted via programmatic interfaces 377, and the results of the analysis may be provided to the client using one or more AnalysisResults messages 437. Other types of programmatic interactions, not shown in FIG. 3 or FIG. 4, may be supported by an EMS 391 in various embodiments.

Example Default Visualizations

Figure 5:
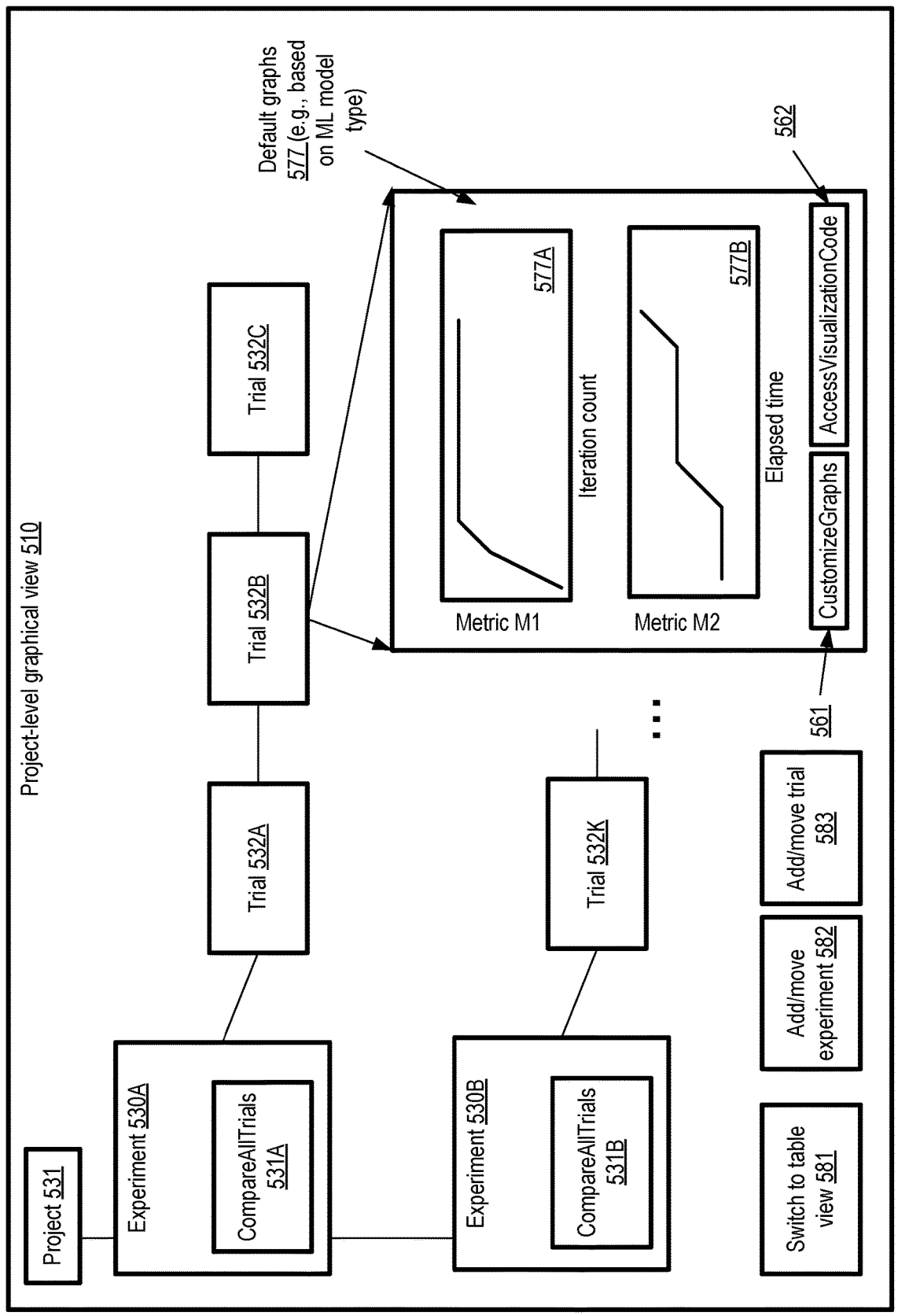
FIG. 5 illustrates an example presentation by an experiment management service of default graphs associated with a trial of an experiment, according to at least some embodiments.

The EMS may provide several levels of information to clients about the results of the experiments being managed. FIG. 5 illustrates an example presentation by an experiment management service of default graphs associated with a trial of an experiment, according to at least some embodiments. As shown, a set of experiments of a project, and trials within the experiments may be indicated via respective icons in a project-level graphical view 510 in some embodiments. For example, trials 532A, 532B and 532C of experiment 530A of a project 531 are depicted in the view 510, and trial 532K of experiment 530B is shown.

In the depicted embodiment, the EMS may construct and display a set of one or more default graphs for each of the trials such as 532A. The types of graphs (i.e., the metrics to be displayed, the scales of the axes, etc.) may be selected automatically by the EMS in at least some embodiments, depending for example on the type of machine learning model being used in the trials or experiments. In at least one embodiment, one or more metrics may be pre-selected for standard algorithms (made available for example in the form of software containers) supported by the MLS. In the scenario depicted in FIG. 5, two graphs 577 are displayed by default for trial 532B: graph 577A showing the variation in metric M1 as a function of iteration count (e.g., the number of completed training iterations, in a scenario in which trial 532B involves an iterative training algorithm), and graph 577B shown the change in a different metric M2 as a function of elapsed time. The default graphs may be displayed, for example, when a client clicks on the icon of trial 532B, or hovers a mouse over the icon in some implementations. In other implementations, the graphs for all the trials may be shown in the project-level graphical view without requiring the client to click on a link or hover a mouse or other interface over the trials.

The CustomizeGraphs control element 561 of the graphical interface may be used by the client to change various properties of the graphs 577 if desired—e.g., to change the axes scales, to zoom in or out of portions of the graph, and so on. In some embodiments, when a client changes properties of one of the graphs for a trial 532, an option may be provided to propagate the change to the corresponding graphs of all the trials of the project. For example, if the client changes the Y-axis of the M1 graph 577A from a linear scale to a logarithmic scale, and chooses to propagate the change, the Y-axes for all the M1 graphs of all the trials may be changed to logarithmic scale. In at least some embodiments, an interface element such as AccessVisualization-Code 562 may be used to allow a client to view and (if desired) change the source code being used to generate the graphs 577—e.g., a Python notebook interface showing the source code may be presented if the client clicks on the AccessVisualizationCode element. In one embodiment, a client may select any of numerous analysis notebook interfaces supported for result presentation/graphing/visualization by an MLS, and the selected notebooks may be presented via EMS interfaces to the client.

In at least some embodiments, a client may be able to view a visualization comparing all the trials of a given experiment or an entire project, e.g., by clicking on a CompareAllTrials interface element 531A or 531B. In the embodiment depicted in FIG. 5, a client may obtain a tabular view of the results of various trials (in contrast to the graphical view) by clicking on an interface element 581 ("Switch to table view"). In the table view itself, users may be able to dynamically re-arrange the information displayed, e.g., by moving columns around, re-sorting on various column values representing respective metrics, and so on. Users may also add or move trials or experiments into the project (or between projects) using interface elements 582 and 583, thereby automatically making addition visualizations to be generated by the EMS.

In various embodiments, results and/or other attributes of various experiment-related entities may be presented using at least three approaches: (a) a tabular view (b) a default graphs view, similar to that shown in FIG. 5, and/or (c) a customized graphs view, if the client wishes to change the default graphs. In some embodiments, when creating an entity instance such as an experiment or a trial, a client may specify the kinds of metrics for which graphs and/or tables are to be displayed with respect to that entity (or its sibling entities in the project hierarchy). In some embodiments, graphical representations of metrics other than results may be displayed—e.g., in a comparison view of the different trials of an experiment, the changes made to various hyper-parameters or tuning parameters from one trials to another may be displayed. Other types of information presentation preferences may be received from EMS clients and implemented at the EMS in different embodiments. In some embodiments, a server-less computing service of a provider network may be employed by the EMS to generate at least some of the graphical views presented. In one embodiment, graphical interface elements may also be used to access debugging tools: e.g., a "debug" button or drop-down menu element may be provided for trials to enable an EMS client to view various artifacts, log files and the like to debug the operations performed in the trial. Access to one or more types of log files (e.g., either in raw form or in post-processed form) generated in tasks such as trials, experiments or procedures may be provided as part of the default EMS interface for viewing the tasks in some embodiments. In some embodiments, the interfaces of the EMS may allow a user to download the data underlying one or more visualizations, and examine/plot the data in detail at client-side computing devices.

Example Model Lineage Information

Figure 6:
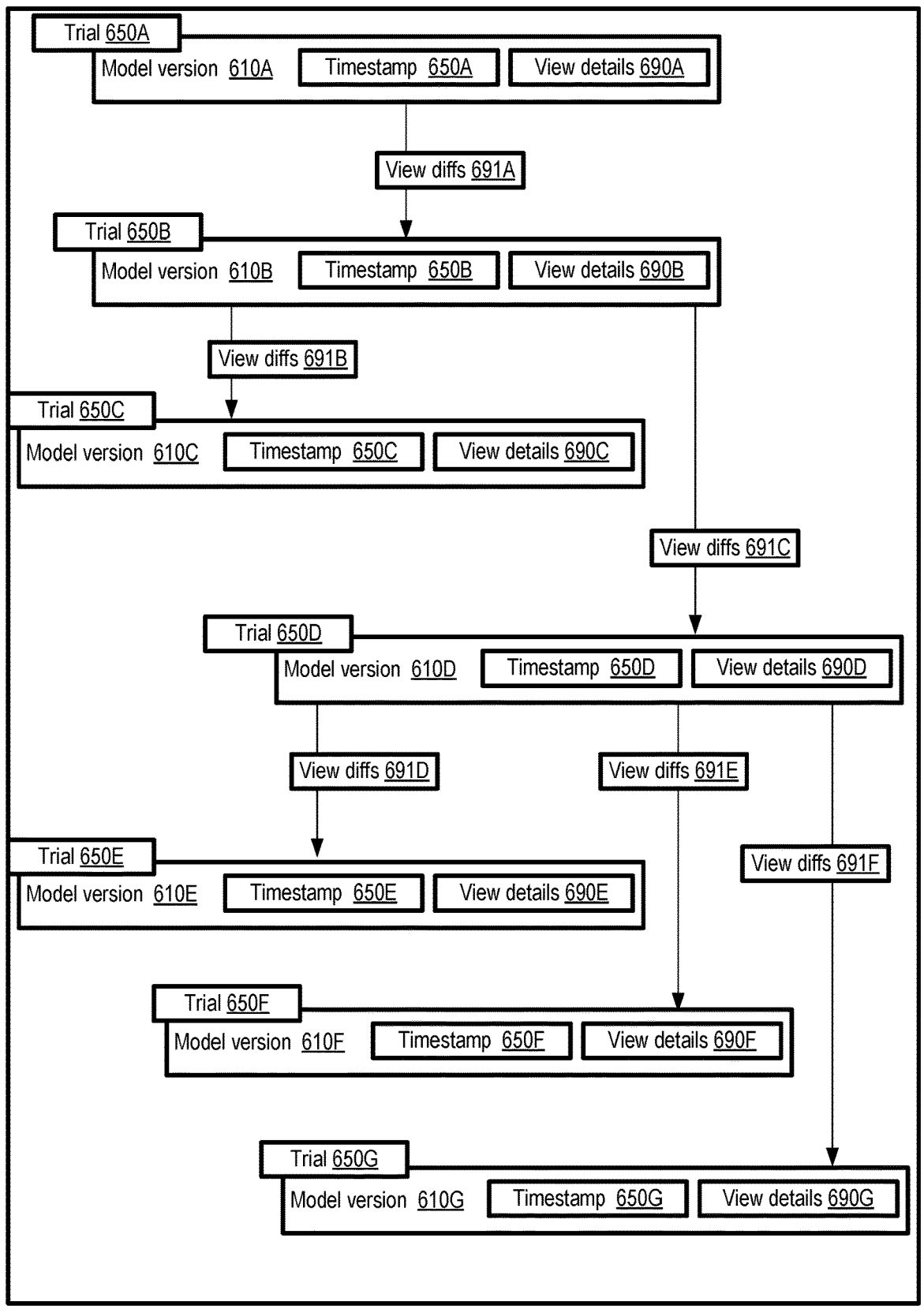
FIG. 6 illustrates an example presentation by an experiment management service of ancestor-descendant relationships among a plurality of machine learning models used for experiment trials, according to at least some embodiments.

FIG. 6 illustrates an example presentation by an experiment management service of ancestor-descendant relationships among a plurality of machine learning models used for experiment trials, according to at least some embodiments. In the depicted embodiment, one or more experiments managed with the help of the EMS may comprise at least seven trials 650A-650G), in each of which a respective version of a machine learning model is utilized.

In response to a programmatic request for lineage information pertaining to one or more of the model versions (e.g., similar to the GetModelLineageInfo request discussed in the context of FIG. 4), a graphical interface 601 may be used to indicate the logical relationships between the related model versions of the trials. A child or direct descendant relationship with respect to a parent model version may indicate that, for example, one or more hyper-parameters, model settings, or portions of model source code of the parent were changed to derive the child version. For example, model version 610B is shown as being derived or descended from model version 610; model versions 610C and 610D are both shown as direct descendants or children of model version 610B; and model versions 610E, 610F and 610G are shown as children of model version 610D. The ancestor-descendant relationships may be deduced at the EMS based on metadata stored for the different trials in the depicted embodiment—e.g., when creating a new trial, an EMS user may in some cases first clone an existing trial and then make modifications to the model of the newly cloned trial, which would indicate a parent-child relationship between the pre-existing source trial and the cloned trial. In some embodiments, the EMS may be able to infer the parent-child relationships by comparing the artifacts (such as hyper-parameter values) of trials, even if the cloning-followed-by-modification approach is not used by the client. With hundreds of model versions being generated for some machine learning problems, providing information about such derivation relationships may be extremely helpful to scientists trying to understand or debug the results of various trials.

In the depicted embodiment, in addition to showing the ancestor-descendant relationships among model versions used in various trials, a number of other types of information may be displayed. For each of the model versions a respective timestamp 650 (e.g., 650A-650G) indicating for example when the model version was created or last modified may be shown. A respective "View details" interface element 690 (e.g., 690A-690G) may be presented in some embodiments, enabling an EMS client access additional artifacts associated with the model versions, such as notes or annotations, source code, etc. In at least one embodiment, a "View diffs" interface element 691 (e.g., 691A-691G) may be provided if a client wishes to view the specific differences between a pair of model versions (e.g., hyper-parameter differences, source code differences, performance or resource consumption differences, and so on). Other types of lineage-related information than the elements shown in FIG. 6 may be presented by the EMS in some embodiments.

Example Search Parameters

Figure 7:
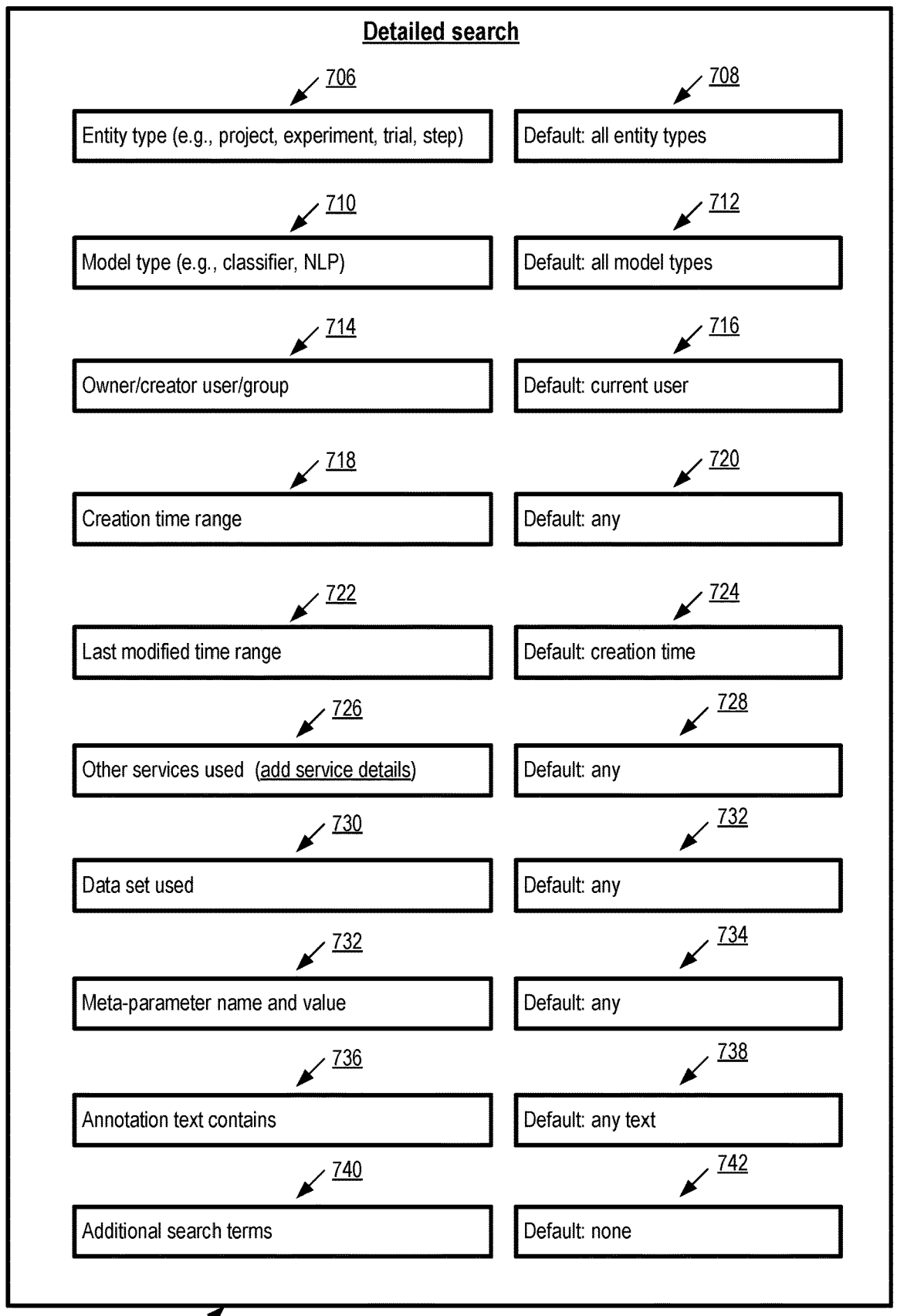
FIG. 7 illustrates an example search interface which may be supported by an experiment management service, according to at least some embodiments.

As mentioned earlier, a rich search capability may be implemented at an EMS in at least some embodiments. FIG. 7 illustrates an example search interface which may be supported by an experiment management service, according to at least some embodiments. Search interface 701 provides a number of different query elements to be specified by an EMS client, with default values for the elements shown as well. The left element in each row of the search interface indicates a particular kind of filtering criterion which the client may specify if desired, and the value(s) for that filtering criterion may be specified using the entry element shown on the right side of the row. In some implementations, drop-down menus may be provided to enable clients to select from a set of available options for the entry elements.

An EMS client may choose to search for instances of a particular entity type (e.g., project, experiment, trial, etc.) as indicated in element 706. If the client does not indicate an entity type in entry element 708, the search may be conducted for any or all entity types by default. Element 710 indicates that a client may filter the results by model type (e.g., classifier, natural language processing (NLP) model, etc.); by default, all model types may be included in the search as indicated in entry element 712.

The search may be restricted in terms of the owner or creator of the entity instances or artifacts, as indicated in element 714. A client account, user name or a group name of interest may be specified in entry element 716; by default, only entities and artifacts associated with the current user (the EMS client using the search interface) may be targeted for the search in the depicted embodiment. Creation time ranges 718 for the entities or artifacts to be returned in response to the search query may be entered using entry element 720, and last modification time ranges 722 may be entered using entry element 724.

In at least some embodiments, it may be the case that several different services (other than the EMS and an associate machine learning service (MLS)) of one or more provider networks may be used for a particular experiment or trial. For example, a provider network may include several different storage or database-related services, and some trials may use a different storage or database service than another. The EMS may keep track of the services used as part of the metadata stored for the experiment, and a client may be able to narrow a search by specifying one or more other services used 726 via entry element 728. In at least some embodiments, the search parameters regarding the use of other may be further narrowed by clicking on the equivalent of an "add service details" link of element 726: e.g., a client may specify not only the name of a storage or database service, but also the identifier of a particular storage object such as a database table or database instance which was used for the experiment, trial or step for which the search is being conducted. A client may provide a URL (Uniform Resource Locator) indicating a specific storage object of a storage service which enables web service-based accesses, in one example scenario, and the EMS search engine may find experiments or trials which involved accessing the storage object via that URL. Such searches may be very helpful in tracking all the different trials or experiments associated with a given storage or database object on the depicted embodiment.

In some embodiments, respective data sets used in machine learning tasks may be assigned specific names such as "Inventory data set Inv1112" or the like. Searches may be restricted by data set used (element 730) by entering the full or partial names of the data sets in element 732 in the depicted embodiment. A client may specify a tuple in entry field 734 indicating a hyper-parameter name and value 732, such as ("num-convolution-layers: 6" to indicate the number of convolution layers of a neural network based model), and the search may thereby be narrowed to focus on only those experiments or trials in which that specific hyper-parameter value was used.

In various embodiments, as mentioned earlier, EMS users may annotate instances of various entities, e.g., by providing unstructured or structured comments, notes and the like. Searches may be restricted based on such annotation text 736 in the depicted embodiment, by entering the targeted text (or an approximate version thereof) in field 738. Additional search terms 740, if desired, which are not covered by the other fields shown in FIG. 7, may be entered using element 742. The search engine of the EMS may create and maintain numerous indices to enable fast responses to search requests submitted via interfaces similar to interface 701; for example, respective indices may be generated for each of the query element types indicated in FIG. 7. Other types of search interface elements than those shown in FIG. 7 may be provided in some embodiments.

Example Leaderboard Interface

In scenarios in which many different trials are being conducted concurrently or near-concurrently, e.g., by different members of a team of data scientists, it may be beneficial to present a graphical representation of the relative results achieved thus far in the different trials. A dynamically updated leaderboard graphical interface may be generated automatically by an EMS to provide such information, and to help track/identify the best performing models quickly, in some embodiments. FIG. 8 illustrates an example leaderboard interface which may be supported by an experiment management service, according to at least some embodiments.

Ranked results for numerous trials of an experiment named E231 are shown by way of example in FIG. 8. A table 808 provides a sorted list of trials arranged in order of their respective results with respect to a primary metric 802 (named Metric1 in the scenario depicted in FIG. 8). If two or more trials happen to be tied with respect to a primary metric 802, one or more tie-breaking metrics 804 (e.g., Metric2) may be used to sort the trials in table 808. Interface element 806 may be used, if desired, by an EMS client to modify the sorting/ranking criteria in some embodiments. In table 808, the rank of various trials (such as Trial-2019 1104-JW, Trial-XLM07, etc.) is shown in the first column, and the time at which the results of the model were obtained is shown in the "Results timestamp" column. The values of the primary and tie-breaking metrics are shown in the Metric1 and Metric2 columns, and the name or user identifier of the person who initiated the trial is shown in the "Trial initiator" column. A subset or all of the annotations or notes entered with respect to the trial may be shown in a "Notes" column of the table 808 in some embodiments. Note that while in the depicted embodiment, EMS users may use arbitrary strings as trial names, in other embodiments a more structured naming procedure or convention may be enforced by an EMS for various entity instances.

In at least some embodiments, when creating an experiment or a trial, an EMS user may be provided the option of requesting the automated generation of a leaderboard similar to that shown in FIG. 8. If a client submits a programmatic request or a parameter value indicating that a leaderboard is to be presented, in some embodiments the client may be able to specify properties such as the metrics to be used to rank trials, the columns of information to be displayed, and so on, to customize the leaderboard as desired. In other embodiments, the client may not have to specify the properties, and the EMS may select the property values for the leaderboard. In one embodiment, a leaderboard may be presented as part of an interactive notebook interface, e.g., created by default for an experiment. In some embodiments, leaderboards may be created to compare experiments (e.g., with the best trial of a given experiment representing that experiment in the leaderboard) and/or other entity types, and may not be restricted to comparing trials within a given experiment.

Example Labeling-Related Metadata

Figure 9:
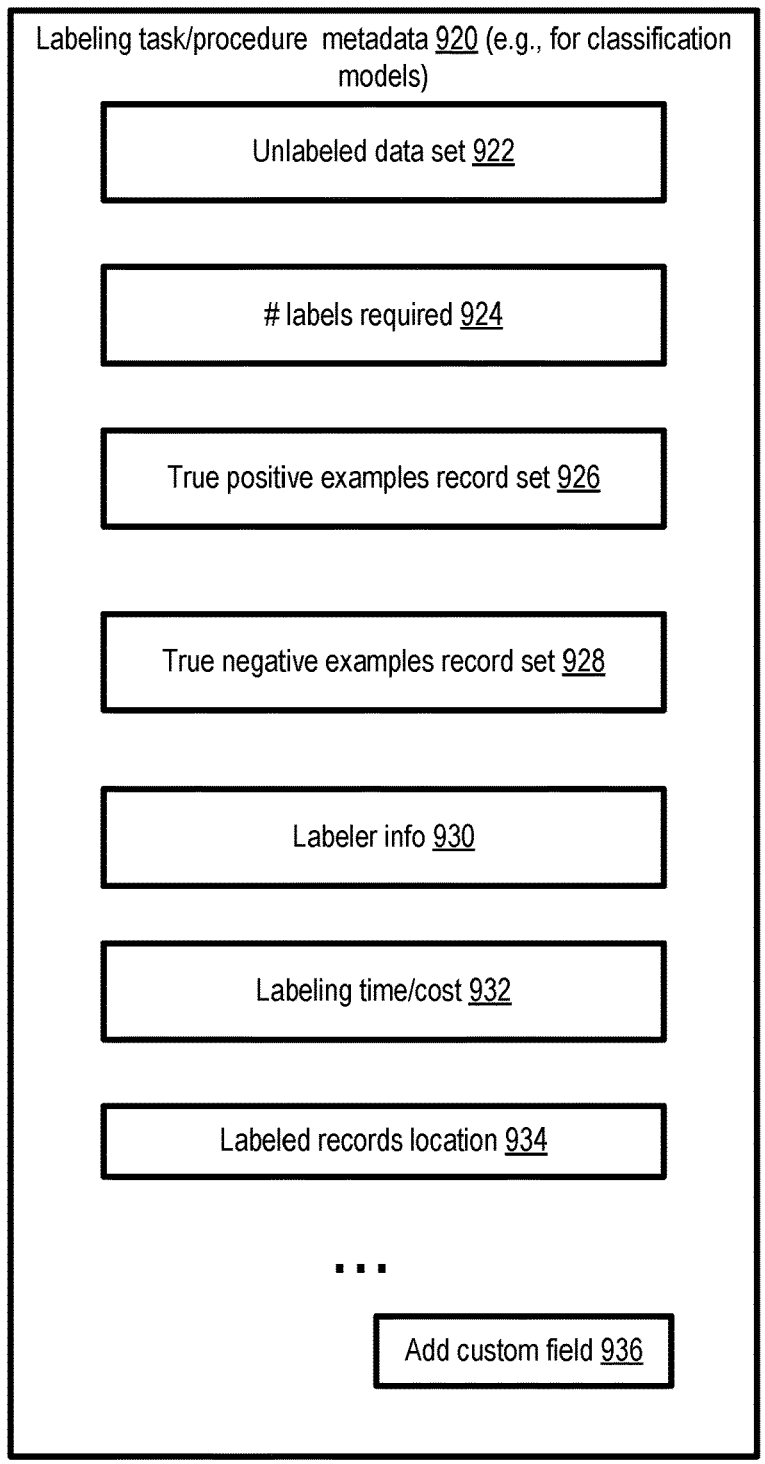
FIG. 9 illustrates an example view of labeling-associated metadata which may be stored at an experiment management service, according to at least some embodiments.

In general, in at least some embodiments, metadata pertaining to any types of operations which could impact the orchestration, conduct or results of experiments may be tracked and managed with the help of an EMS. In some embodiments, as mentioned earlier, the EMS may store metadata associated with preparation steps for machine learning trials, such as data labeling or data cleansing operations. FIG. 9 illustrates an example view of labeling-associated metadata which may be stored at an experiment management service, according to at least some embodiments. Often, very large unlabeled data sets, comprising millions of records, may be available for some machine learning models such as classifiers, and the costs and effort associated with labeling a sufficient subset of the training data to train, test and evaluate high-quality models may be significant. As such, the ability to view and compare labeling related information (as well as information about other preparatory or conclusory tasks) of machine learning efforts may be extremely beneficial to obtain a holistic view of the overall work involved in completing a set of experiments. Metadata 920 associated with a labeling task or procedure, which may be part of the operations performed in preparation for training trials of one or more classification models, may include an indication (e.g., an identifier) of a storage object or multiple storage objects containing an unlabeled data set 922, as well as the number or fraction 924 of records to be labeled from that unlabeled data set.

In order to facilitate the labeling of the records in some embodiments, true positive example records and/or true negative example records for various target classes may be identified and provided to annotators. A respective reference 926 and 928 to sets of true positive example records and true negative example records may be stored as part of the labeling-related metadata in the depicted embodiment. Information about the labelers or annotators used may be stored in element 930, the time or cost associated with labeling may be indicated in field 932, and a location at which the labeled records are stored may be indicated in field 934 in the depicted embodiment. Other fields associated with labeling tasks may be included in EMS metadata in some embodiments than those shown in FIG. 9, such as labeling task definitions (i.e., specifying what distinguishing characteristics are to be used to label records) and labeling interfaces (i.e., details of programmatic interfaces made available to record annotators or labelers). EMS clients may add custom fields to the metadata associated with a labeling task (or any other type of task) in at least one embodiment, e.g., by clicking in the equivalent of an "Add custom field" interface element 936 or the like. Metadata similar to metadata 920 may be created and stored for other tasks which do not represent trials per se, such as cleansing data, normalizing or reformatting data from different sources, ensuring that no copy of the data remains accessible to potentially unauthorized users after the experiments on the data have been completed, and so on.

Example Provider Network

Figure 10:
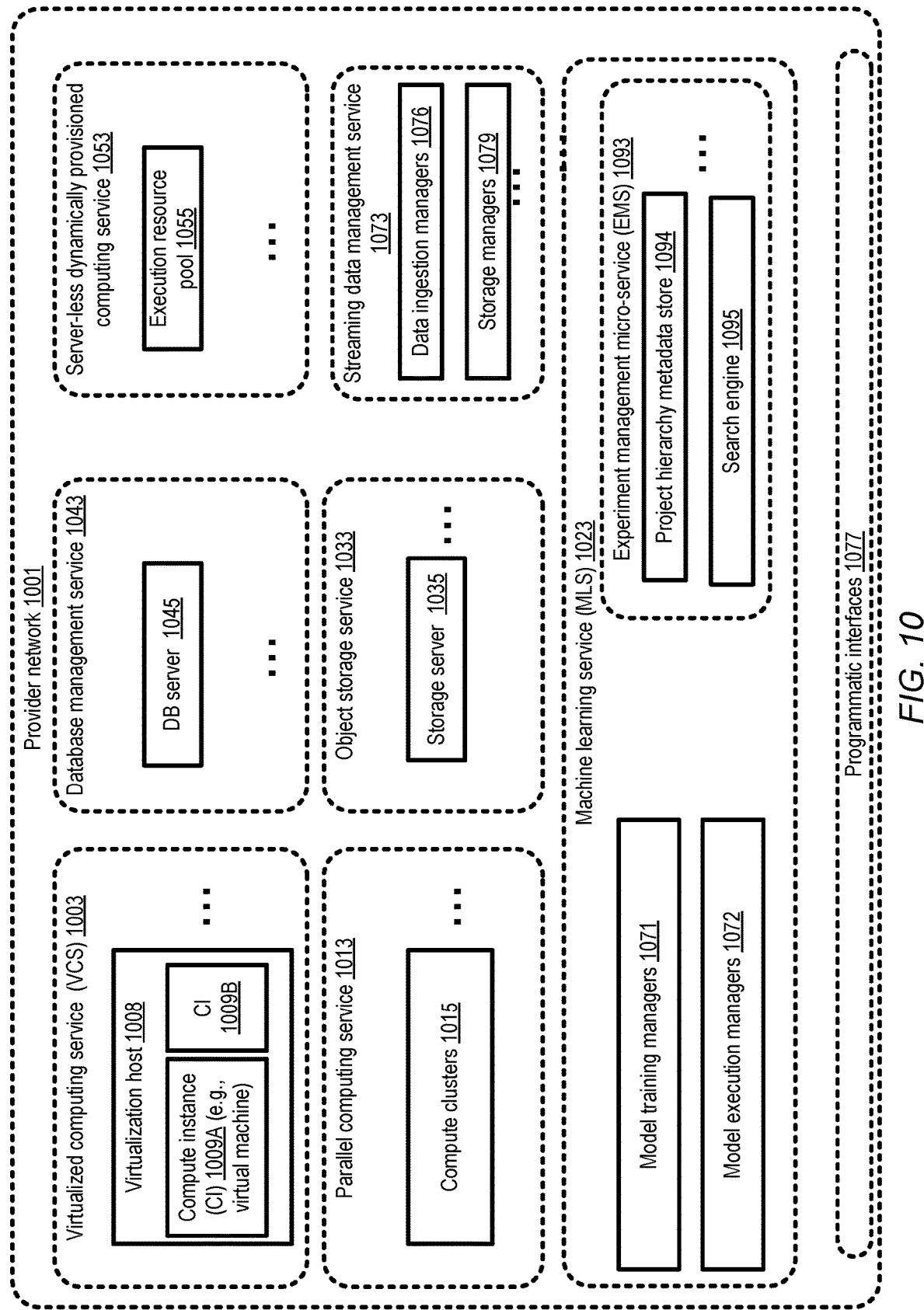
FIG. 10 illustrates an example provider network at which an experiment management service may be implemented, according to at least some embodiments.

As mentioned earlier, in at least some embodiments, an experiment management service similar to EMS 132 of FIG. 1 may be implemented as part of a suite of services of a provider network or cloud computing environment. FIG. 10 illustrates an example provider network at which an experiment management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries. For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In the embodiment depicted in FIG. 10, provider network 1001 includes a virtualized computing service 1003, a database management service 1043, a server-less dynamically provisioned computing service 1053, a parallel computing service 1013, an object storage service 1033, a streaming data management service 1073, as well as a machine learning service 1023 within which an experiment management micro-service (EMS) 1093 similar in features and functionality of EMS 132 of FIG. 1 is implemented. EMS 1093, which may include numerous computing and/or storage devices implementing a project hierarchy metadata store 1094, a search engine 1095, as well as other components similar to those shown in EMS 132 of FIG. 1, may be closely tied to the machine learning service 1023 in the depicted embodiment. For example, the EMS 1093 may include built-in knowledge about various types of operations performed by model training managers 1071 and/or model execution managers 1072, the kinds of algorithms supported at the MLS 1023, the kinds of jobs (including automated tuning jobs which can correspond to a set of trials, batch model evaluation jobs, model training jobs, model deployment jobs, etc.) which can be requested by MLS clients, the kinds of result metrics in which data scientists are most often interested with regard to machine learning models, the interfaces to be used to obtain metadata about experiments conducted in the MLS 1023, and so on. In some embodiments, for certain types of jobs supported at the MLS, the EMS may automatically create a set of corresponding experiment and trials instances, and populate the metadata for the instances using MLS-supported programmatic interfaces.

Each of the services of provider network 1001 may include a respective set of computing devices and/or other resources in some embodiments. Components of a given service may utilize components of other services in the depicted embodiment—e.g., compute instances (CIs) 1009A or 1009B (such as guest virtual machines) set up at the virtualization hosts 1008 of the virtualized computing service 1003 and/or storage servers 1035 of an object storage service 1033 may be employed by various other services of provider network 1001 to implement their respective functions. Individual ones of the services shown in FIG. 10 may implement a respective set of programmatic interfaces 1077 which can be used by external and/or internal clients (where the internal clients may comprise components of other services) in the depicted embodiment. Individual ones of the services shown in FIG. 10 may each provide high levels of automated scalability, availability, data durability, and failure resilience, enabling varying levels of workloads to be handled gracefully.

EMS 1093 may interact with or utilize other services of the provider network 1001 in several different ways in the depicted embodiment. First, at least some components of the EMS may utilize components of other services—e.g., search engine 1095 may comprise one or more compute instances 1009 or compute clusters 1015 of parallel computing service 1013, search indices and other data used by the EMS may be stored at database servers 1045 or storage servers 1035, visualization data sets may be prepared using resources of server-less dynamically provisioned execution resources pool 1055, data sets used for experiments managed using the EMS 1093 may be collected at data ingestion managers 1076 and stored by storage managers 1079 of streaming data management service 1073, and so on. Secondly, the EMS may act as an intermediary that interacts with other services to obtain and present experiment-related information for users of the MLS 1023. For example, some results or other artifacts of machine learning training or model executions may be generated at a parallel computing service 1013 and/or stored at database management service 1043 or object storage service 1033, and the EMS may provide easy-to-use interfaces that allow MLS users to view such artifacts within a common portal or framework without having to access the different underlying services separately (which may involve having to use respective credentials for each service). If/when an EMS client wishes to perform a computation associated with the experiment metadata, such as customizing a visualization of a large data set, the EMS may automatically invoke the appropriate service (such as server-less dynamically-provisioned computing service 1053, the virtualized computing service 1003, etc.), without requiring the EMS user to invoke the services needed. In at least one embodiment, at least some of the techniques discussed above for managing experiment metadata may be implemented without acquiring resources of network-accessible services such as those shown in FIG. 10. For example, a standalone set of computing devices which are not part of a network-accessible service may be used in some embodiments.

Methods for Experiment Management

Figure 11:
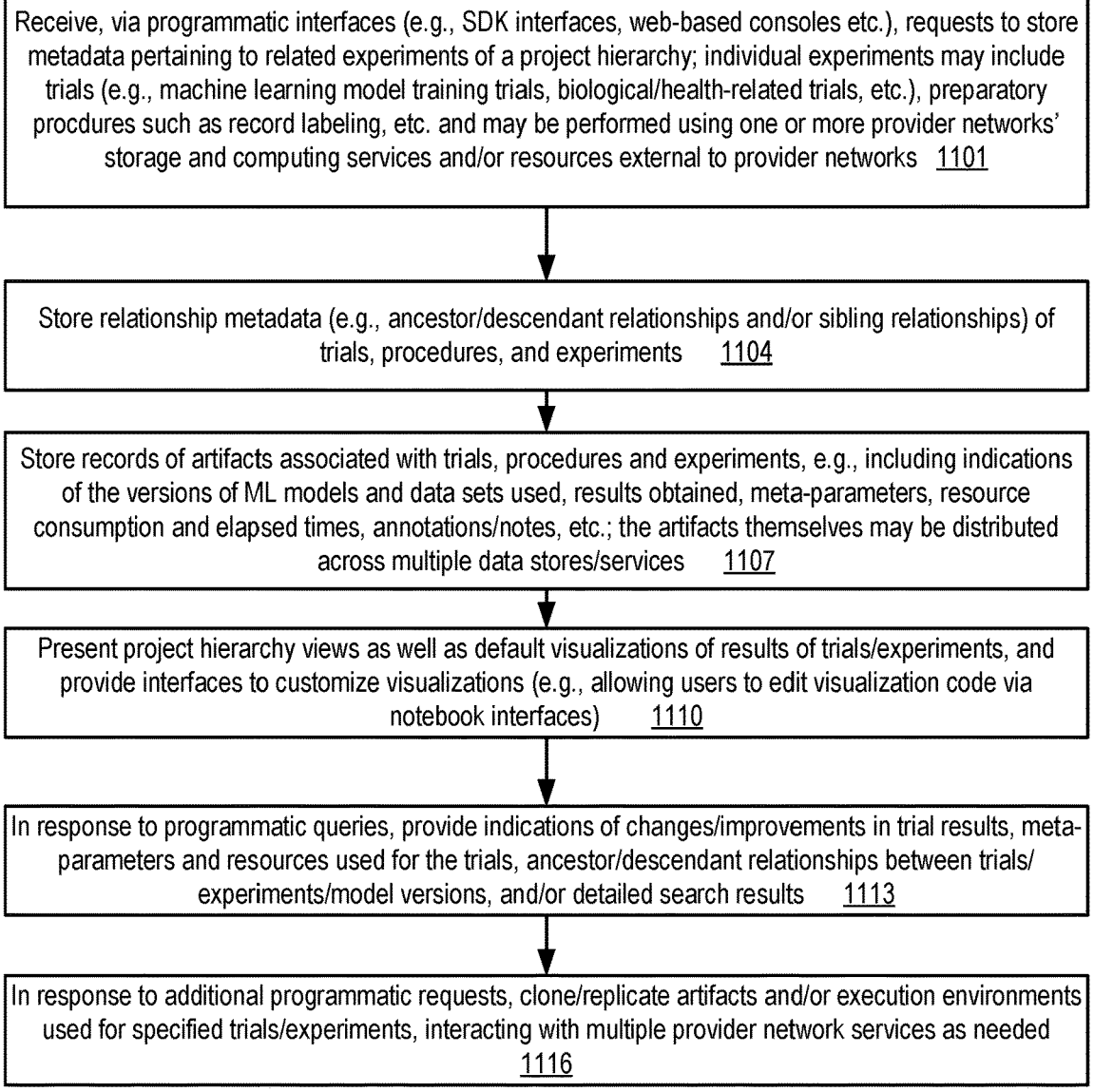
FIG. 11 is a flow diagram illustrating aspects of operations that may be performed at an experiment management service, according to at least some embodiments.

FIG. 11 is a flow diagram illustrating aspects of operations that may be performed at an experiment management service, according to at least some embodiments. As shown in element 1101, one or more requests to store metadata pertaining to related experiments of a project hierarchy may be received, e.g., via programmatic interfaces of an EMS similar in features and functionality to EMS 132 of FIG. 1. The experiments within a given project of the project hierarchy may for example include one or more trials (e.g., machine learning model trials, biological or health-related trials, etc.), preparatory procedures such as record labeling in the case of machine learning trials, and/or conclusory procedures such as resource release operations, deployment of trained models, etc. The trials and/or procedures may comprise a set of workflow steps in some cases, and respective metadata may be stored for each instance of a project, experiment, procedure, trial and/or step at the EMS. In some cases, at least some of a project's tasks (e.g., experiments, trials, procedures, etc.) may be performed using one or more services of a provider network, such as one or more computing services and/or storage services, a machine learning service and the like. Other tasks may be performed at least in part using resources external to provider networks—e.g., using client-premise computing devices, data scientists' or annotators' laptops, desktops or mobile computing devices, and so on.

The EMS may store relationship metadata (e.g., logical ancestor/descendant relationships indicating derivation of some tasks or their artifacts from others, sibling relationships indicating branching out from a common parent task, etc.) of various ones of the experiment-related entities such as experiments, trials, procedures and the like in various embodiments (element 1104). Records of artifacts associated with the trials, procedures and experiments may be stored at the EMS in at least some embodiments (element 1107), such as indications of the versions of machine learning models used in various trials, the results obtained, hyper-parameters and/or other tuning parameters, the data sets used, resource consumption (e.g., at various provider network services) and elapsed time information for various tasks, annotations/notes made by the experimenters, and so on. In some embodiments the artifacts themselves may be distributed across multiple services of one or more provider networks, and the EMS may act as a centralized clearinghouse or aggregator for the artifacts.

The EMS may provide responses to various types of programmatic requests, similar to the requests discussed in the context of FIG. 3 and FIG. 4 in the depicted embodiment. For example, as indicated in element 1110, the EMS may cause graphical or text representations of project hierarchies to be provided, default visualizations comprising one or more graphs showing results of trials or experiments, and provide interfaces to enable clients to customize the visualizations if desired (e.g., by allowing EMS users to edit the code underlying the default visualizations, change properties such as axes, and so on.) In response to programmatic queries, as shown in element 1113, the EMS may provide comparison information pertaining to the experiments such as indications of changes/improvements in trial results, hyper-parameter values used in various trials/experiments, ancestor/descendant relationships between trials or experiments or artifacts such as model versions, and/or detailed search results based on various attribute combinations. Any of a variety of search parameters may be specified by clients, such as (but not limited to) those shown in FIG. 6 in different embodiments. For example, a client could indicate hyper-parameter values, names of provider network services, data set identifiers and the like as search parameters, and the EMS may provide a response indicating changes in results achieved using a model that was trained using the specified hyper-parameter values and the specified data sets, where the training or evaluation was conducted at the specified provider network services.

In at least some embodiments, the EMS may present a number of options for cloning or replicating experiments, trials or associated artifacts. For example, a set of artifacts (parameter files, data sets, and the like) may be cloned or replicated in response to some programmatic requests (element 1116), while in response to other programmatic requests, entire execution environments (including needed artifacts) may be cloned so that experiments or trials may be re-run if desired. Cloning of successful trials may, for example enable data scientists and others to create new trials with further incremental improvements in various embodiments. The EMS may enable clients to extend the core entity types (projects, experiments, trials, procedures, and steps) in some embodiments, and to customize various aspects of the user interfaces as desired, making it easy for any types of experiments (not just machine learning-related experiments) to be organized and managed.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of providing a network-accessible service with user-friendly interfaces for managing experiments and associated metadata may be useful in a variety of scenarios. As more and more different types of problems are being addressed using machine learning methodologies, many of which involve large numbers of experiments before an acceptable solution is found, the amount of data generated in related groups of experiments has grown dramatically. By utilizing the described techniques and interfaces, experimenters in a variety of fields (including machine learning as well as fields other than machine learning) may be able to easily organize and track experiment artifacts and results, avoid redundant experiments, share insights with others, and more quickly conclude related sets of experiments.

Illustrative Computer System

Figure 12:
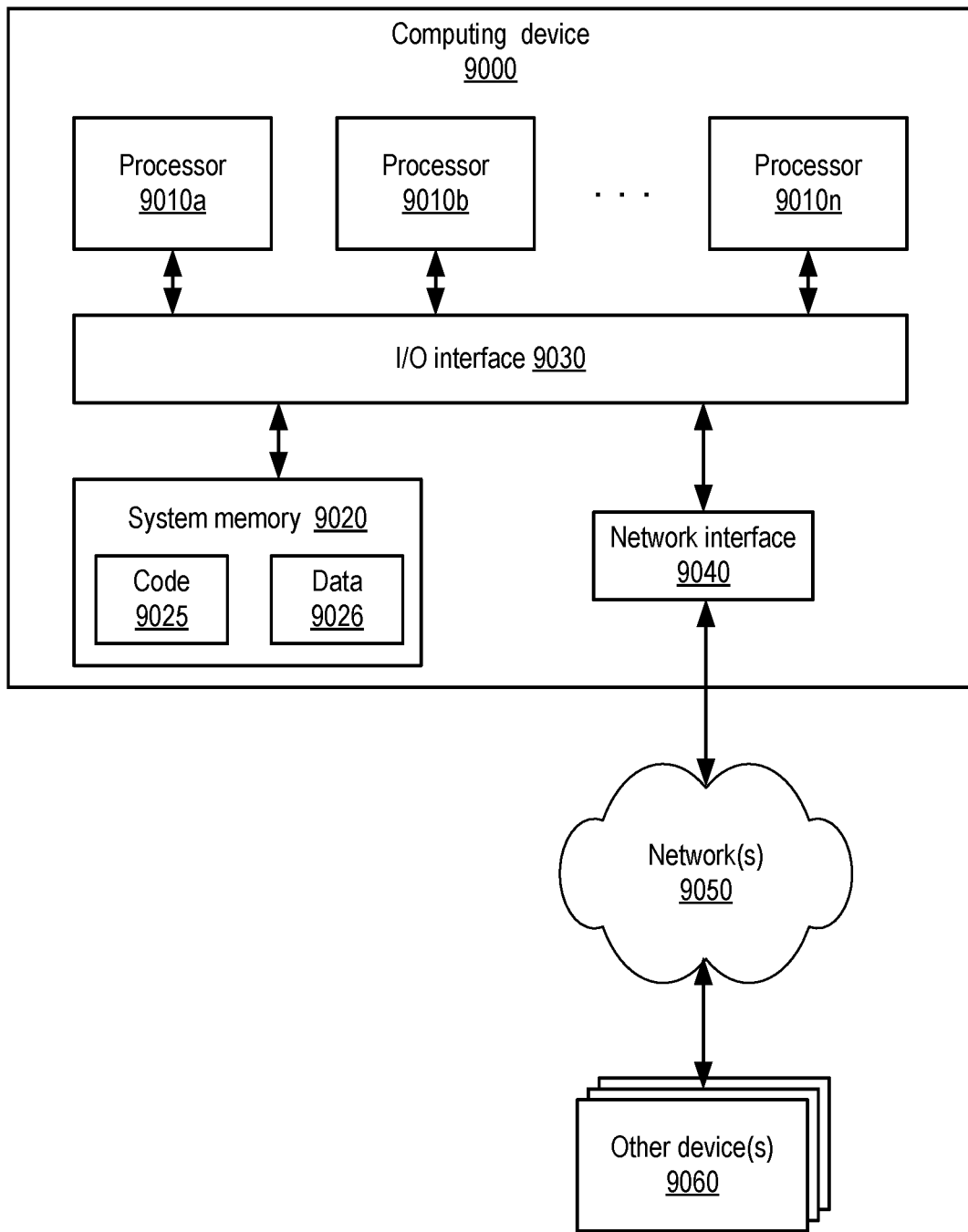
FIG. 12 is a block diagram illustrating an example computing device that may be used in at least some embodiments.

In at least some embodiments, a server that implements one or more of the techniques described herein, including for example components of an experiment management service, a machine learning service and/or other services of a provider network and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and/or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via a storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   automatically collecting, without user-specification of the collecting and by a common framework configured to store and compare metrics for a plurality of related machine learning experiments conducted at least in part using resources of a cloud computing environment including a plurality of different machine learning framework resources selected for different ones of the plurality of related machine learning experiments, metrics generated at the selected plurality of different machine learning framework resources, wherein the related machine learning experiments include at least a first experiment which comprises a plurality of runs of a machine learning model;
   in response to a first set of input received via one or more programmatic interfaces of the cloud computing environment,
      providing, by the common framework, an indication of the plurality of related machine learning experiments;
   in response to a second set of input received via the one or more programmatic interfaces,
      providing, by the common framework, respective indications of individual runs of the plurality of runs; and
   in response to a third set of input received via the one or more programmatic interfaces,
      providing, by the common framework, an indication of one or more artifacts associated with a particular run of the plurality of runs, wherein the one or more artifacts include (a) a representation of a version of the machine learning model used in the particular run and (b) one or more of the metrics associated with one or more steps of the particular run and automatically collected based on the selected machine learning framework resource for the machine learning model used in the particular run without user-specification of collection of the one or more metrics.

2. The computer-implemented method as recited in claim 1, further comprising:
   in response to a fourth set of input received via the one or more programmatic interfaces, presenting a representation of a difference in results between a first run of the plurality of runs and a second run of the plurality of runs.

3. The computer-implemented method as recited in claim 1, further comprising:
   in response to a fourth set of input received via the one or more programmatic interfaces, presenting a representation of a difference in one or more tuning parameters between a first run of the plurality of runs and a second run of the plurality of runs.

4. The computer-implemented method as recited in claim 1, further comprising:
   in response to a fourth set of input received via the one or more programmatic interfaces, presenting a representation of a difference in resource consumption between a first run of the plurality of runs and a second run of the plurality of runs.

5. The computer-implemented method as recited in claim 1, further comprising:
   in response to a fourth set of input received via the one or more programmatic interfaces, presenting an indication that a first version of a machine learning model utilized during a first run of the plurality of runs is derived from a second version of the machine learning model.

6. The computer-implemented method as recited in claim 1, further comprising:
in response to a fourth set of input received via the one or more programmatic interfaces, cloning an execution environment utilized for a first run of the plurality of runs.

7. The computer-implemented method as recited in claim 1, further comprising:
in response to a fourth set of input received via the one or more programmatic interfaces, presenting a result of a causal analysis of an error encountered in a particular run of the plurality of runs.

8. A system, comprising:
one or more computing devices;
wherein the one or more computing devices include instructions that upon execution on or across the one or more computing devices:
automatically collect, without user-specification of said collect and by a common framework configured to store and compare metrics for a plurality of related machine learning experiments conducted at least in part using resources of a cloud computing environment including a plurality of different machine learning framework resources selected for different ones of the plurality of related machine learning experiments, metrics generated at the selected plurality of different machine learning framework resources, wherein the related machine learning experiments include at least a first experiment which comprises a plurality of runs of a machine learning model;
in response to a first set of input received via one or more programmatic interfaces of the cloud computing environment,
provide, by the common framework, an indication of the plurality of related machine learning experiments;
in response to a second set of input received via the one or more programmatic interfaces,
provide, by the common framework, respective indications of individual runs of the plurality of runs; and
in response to a third set of input received via the one or more programmatic interfaces,
provide, by the common framework, an indication of one or more artifacts associated with a particular run of the plurality of runs, wherein the one or more artifacts include (a) a representation of a version of the machine learning model used in the particular run and (b) one or more of the metrics associated with one or more steps of the particular run and automatically collected based on the selected machine learning framework resource for the machine learning model used in the particular run without user-specification of collection of the one or more metrics.

9. The system as recited in claim 8, wherein the one or more computing devices include further instructions that upon execution on or across the one or more computing devices:
in response to a fourth set of input received via the one or more programmatic interfaces, present a representation of a difference in results between a first run of the plurality of runs and a second run of the plurality of runs.

10. The system as recited in claim 8, wherein the one or more computing devices include further instructions that upon execution on or across the one or more computing devices:
in response to a fourth set of input received via the one or more programmatic interfaces, present a representation of a difference in one or more tuning parameters between a first run of the plurality of runs and a second run of the plurality of runs.

11. The system as recited in claim 8, wherein the one or more computing devices include further instructions that upon execution on or across the one or more computing devices:
in response to a fourth set of input received via the one or more programmatic interfaces, present a representation of a difference in resource consumption between a first run of the plurality of runs and a second run of the plurality of runs.

12. The system as recited in claim 8, wherein the one or more computing devices include further instructions that upon execution on or across the one or more computing devices:
in response to a fourth set of input received via the one or more programmatic interfaces, present an indication that a first version of a machine learning model utilized during a first run of the plurality of runs is derived from a second version of the machine learning model.

13. The system as recited in claim 8, wherein the one or more computing devices include further instructions that upon execution on or across the one or more computing devices:
in response to a fourth set of input received via the one or more programmatic interfaces, clone an execution environment utilized for a first run of the plurality of runs.

14. The system as recited in claim 8, wherein the one or more computing devices include further instructions that upon execution on or across the one or more computing devices:
in response to a fourth set of input received via the one or more programmatic interfaces, present a result of a causal analysis of an error encountered in a particular run of the plurality of runs.

15. One or more non-transitory computer-accessible storage media storing program instructions that when executed on or across one or more processors:
automatically collecting, without user-specification of the collecting and by a common framework configured to store and compare metrics for a plurality of related machine learning experiments conducted at least in part using resources of a cloud computing environment including a plurality of different machine learning framework resources selected for different ones of the plurality of related machine learning experiments, metrics generated at the selected plurality of different machine learning framework resources, wherein the related machine learning experiments include at least a first experiment which comprises a plurality of runs of a machine learning model;
in response to a first set of input received via one or more programmatic interfaces of the cloud computing environment,
provide, by the common framework, an indication of the plurality of related machine learning experiments;
in response to a second set of input received via the one or more programmatic interfaces, provide, by the common framework, respective indications of individual runs of the plurality of runs; and in response to a third set of input received via the one or more programmatic interfaces, provide, by the common framework, an indication of one or more artifacts associated with a particular run of the plurality of runs, wherein the one or more artifacts include (a) a representation of a version of the machine learning model used in the particular run and (b) one or more of the metrics associated with one or more steps of the particular run and automatically collected based on the selected machine learning framework resource for the machine learning model used in the particular run without user-specification of collection of the one or more metrics.

16. The one or more non-transitory computer-accessible storage media as recited in claim 15, storing further program instructions that when executed on or across the one or more processors:

in response to a fourth set of input received via the one or more programmatic interfaces, present a representation of a difference in results between a first run of the plurality of runs and a second run of the plurality of runs.

17. The one or more non-transitory computer-accessible storage media as recited in claim 15, storing further program instructions that when executed on or across the one or more processors:

in response to a fourth set of input received via the one or more programmatic interfaces, present a representation of a difference in one or more tuning parameters between a first run of the plurality of runs and a second run of the plurality of runs.

18. The one or more non-transitory computer-accessible storage media as recited in claim 15, storing further program instructions that when executed on or across the one or more processors:

in response to a fourth set of input received via the one or more programmatic interfaces, present a representation of a difference in resource consumption between a first run of the plurality of runs and a second run of the plurality of runs.

19. The one or more non-transitory computer-accessible storage media as recited in claim 15, storing further program instructions that when executed on or across the one or more processors:

in response to a fourth set of input received via the one or more programmatic interfaces, present an indication that a first version of a machine learning model utilized during a first run of the plurality of runs is derived from a second version of the machine learning model.

20. The one or more non-transitory computer-accessible storage media as recited in claim 15, storing further program instructions that when executed on or across the one or more processors:

in response to a fourth set of input received via the one or more programmatic interfaces, clone an execution environment utilized for a first run of the plurality of runs.

\* \* \* \* \*